United States Patent
Prim et al.

(10) Patent No.: US 9,200,833 B2
(45) Date of Patent: Dec. 1, 2015

(54) HEAVY HYDROCARBON PROCESSING IN NGL RECOVERY SYSTEM

(71) Applicant: Pilot Energy Solutions, LLC, Houston, TX (US)

(72) Inventors: Eric Prim, Houston, TX (US); Naomi Baker, The Woodlands, TX (US); Jhansi Garikipati, Houston, TX (US)

(73) Assignee: Pilot Energy Solutions, LLC, Houston, TX (US)

( * ) Notice: Subject to any disclaimer, the term of this patent is extended or adjusted under 35 U.S.C. 154(b) by 0 days.

(21) Appl. No.: 13/946,789

(22) Filed: Jul. 19, 2013

(65) Prior Publication Data
US 2013/0305777 A1 Nov. 21, 2013

Related U.S. Application Data

(63) Continuation-in-part of application No. 13/096,788, filed on Apr. 28, 2011, which is a continuation of application No. 12/122,336, filed on May 16, 2008, now Pat. No. 8,505,332.

(Continued)

(51) Int. Cl.
*F25J 3/00* (2006.01)
*F25J 3/02* (2006.01)
*C10L 3/10* (2006.01)

(52) U.S. Cl.
CPC .............. *F25J 3/0266* (2013.01); *C10L 3/104* (2013.01); *F25J 3/0209* (2013.01); *F25J 3/0219* (2013.01);

(Continued)

(58) Field of Classification Search
CPC ....... F25J 3/0209; F25J 3/0233; F25J 3/0242; F25J 3/0266; F25J 2200/74; F25J 2220/66; F25J 2260/80; F25J 2205/04; F25J 2215/04; F25J 2215/80; F25J 2220/02; F25J 2220/04; F25J 2220/65; F25J 2220/68; C10L 3/103; C10L 3/104
USPC .................. 62/617, 618, 620, 622, 928, 929, 62/630–631; 585/818, 802, 833, 837
See application file for complete search history.

(56) References Cited

U.S. PATENT DOCUMENTS 2,955,081 A * 10/1960 Cobb, Jr. ..................... 208/344
3,090,683 A * 5/1963 Berger ......................... 48/127.3

(Continued)

OTHER PUBLICATIONS

Prim, Eric.; U.S. Appl. No. 12/122,336; Title: "Natural Gas Liquid Recovery Process;" filed May 16, 2008.

(Continued)

*Primary Examiner* — Frantz Jules
*Assistant Examiner* — Keith Raymond
(74) *Attorney, Agent, or Firm* — Conley Rose, P.C.; Grant Rodolph

(57) ABSTRACT

A method for processing heavy hydrocarbons in an NGL recovery system is provided. In one embodiment, a feed stream is separated into a carbon dioxide recycle stream and a heavy hydrocarbon stream. The heavy hydrocarbon stream comprises carbon dioxide and natural gas liquids, and the heavy hydrocarbon stream comprises heavy hydrocarbons. The carbon dioxide recycle stream is separated into a purified carbon dioxide recycle stream and a natural gas liquids stream. The purified carbon dioxide recycle stream comprises the carbon dioxide, and the natural gas liquids stream comprises the natural gas liquids. In another embodiment, a set of process equipment comprises a first separator and a second separator. The first separator is configured to separate a feed stream into a recycle stream and a heavy hydrocarbons stream, and the second separator is configured to separate the recycle stream into a purified recycle stream and a natural gas liquids stream.

10 Claims, 7 Drawing Sheets

Related U.S. Application Data

(60) Provisional application No. 60/938,726, filed on May 18, 2007, provisional application No. 61/730,696, filed on Nov. 28, 2012, provisional application No. 61/823,047, filed on May 14, 2013.

(52) U.S. Cl.
CPC .............. *F25J 3/0233* (2013.01); *F25J 3/0242* (2013.01); *F25J 3/0247* (2013.01); *F25J 2200/02* (2013.01); *F25J 2200/74* (2013.01); *F25J 2220/66* (2013.01); *F25J 2260/80* (2013.01); *F25J 2290/10* (2013.01); *Y02C 10/12* (2013.01)

(56) References Cited

U.S. PATENT DOCUMENTS

| | | | |
|---|---|---|---|
| 3,441,483 A | 4/1969 | Hart | |
| 4,136,738 A | 1/1979 | Haynes, Jr. et al. | |
| 4,336,046 A | 6/1982 | Schorre et al. | |
| 4,374,657 A | 2/1983 | Schendel et al. | |
| 4,428,759 A | 1/1984 | Ryan et al. | |
| 4,441,900 A | 4/1984 | Swallow | |
| 4,451,275 A | 5/1984 | Vines et al. | |
| 4,529,411 A | 7/1985 | Goddin, Jr. et al. | |
| 4,563,202 A * | 1/1986 | Yao et al. | 2/17 |
| 4,595,404 A | 6/1986 | Ozero et al. | |
| 4,664,190 A | 5/1987 | Carpentier | |
| 4,683,948 A | 8/1987 | Fleming | |
| 4,720,294 A | 1/1988 | Lucadamo et al. | |
| 4,753,666 A | 6/1988 | Pastor et al. | |
| 4,762,543 A | 8/1988 | Pantermuehl et al. | |
| 4,765,407 A | 8/1988 | Yuvancic | |
| 5,019,279 A * | 5/1991 | Haines et al. | 507/202 |
| 5,402,645 A | 4/1995 | Johnson et al. | |
| 5,411,721 A | 5/1995 | Doshi et al. | |
| 5,687,584 A | 11/1997 | Mehra | |
| 6,128,919 A | 10/2000 | Daus et al. | |
| 6,505,683 B2 | 1/2003 | Minkkinen et al. | |
| 6,648,944 B1 | 11/2003 | Baker et al. | |
| 6,915,662 B2 | 7/2005 | Wilkinson et al. | |
| 7,219,513 B1 | 5/2007 | Mostafa | |
| 7,377,127 B2 | 5/2008 | Mak | |
| 7,806,965 B2 | 10/2010 | Stinson | |
| 2003/0161780 A1 * | 8/2003 | Howard et al. | 423/437.1 |
| 2004/0206112 A1 | 10/2004 | Mak | |
| 2006/0065015 A1 | 3/2006 | McCoy | |
| 2008/0156035 A1 | 7/2008 | Aspelund et al. | |
| 2011/0197629 A1 | 8/2011 | Prim et al. | |
| 2013/0298601 A1 | 11/2013 | Prim | |
| 2013/0298602 A1 | 11/2013 | Prim | |
| 2013/0333417 A1 | 12/2013 | Prim | |

OTHER PUBLICATIONS

Office Action dated Oct. 27, 2011; U.S. Appl. No. 12/122,336, filed May 16, 2008, 17 pages.
Office Action dated Jun. 29, 2012; U.S. Appl. No. 12/122,336, filed May 16, 2008, 18 pages.
Office Action dated Feb. 21, 2013; U.S. Appl. No. 12/122,336, filed May 16, 2008, 24 pages.
Notice of Allowance dated May 8, 2013; U.S. Appl. No. 12/122,336, filed May 16, 2008; 23 pages.
Office Action dated Jul. 19, 2012; U.S. Appl. No. 13/096,788, filed Apr. 28, 2011; 22 pages.
Office Action dated May 8, 2013; U.S. Appl. No. 13/096,788, filed Apr. 28, 2011; 23 pages.
Foreign Communication From a Counterpart Application, Canadian Application No. 2739366, Canadian Office Action dated Aug. 21, 2013, 3 pages.
Office Action dated Jun. 18, 2014; U.S. Appl. No. 13/096,788, filed Apr. 28, 2011; 26 pages.
Office Action dated Sep. 23, 2014, U.S. Appl. No. 13/096,788, filed Apr. 28, 2011, 3 pages.
Office Action dated Jan. 24, 2014; U.S. Appl. No. 13/946,753, filed Jul. 19, 2013; 37 pages.
Office Action dated Jul. 30, 2014; U.S. Appl. No. 13/946,753, filed Jul. 19, 2013; 19 pages.
Office Action dated Jul. 15, 2014; U.S. Appl. No. 13/946,773, filed Jul. 19, 2013; 28 pages.
Office Action dated Jul. 15, 2014; U.S. Appl. No. 13/946,774, filed Jul. 19, 2013; 26 pages.
Foreign Communication From a Counterpart Application, Canadian Application No. 2739366, Canadian Office Action dated Apr. 16, 2014, 2 pages.
Office Action dated Oct. 23, 2014, 36 pages, U.S. Appl. No. 13/096,788, filed Apr. 28, 2011.
Notice of Allowance dated May 19, 2015, 13 pages, U.S. Appl. No. 13/096,788, filed Apr. 28, 2011.
Office Action dated Jan. 16, 2015, U.S. Appl. No. 13/946,753, filed Jul. 16, 2015; 30 pages.
Office Action dated Jan. 29, 2015 U.S. Appl. No. 13/946,773, filed Jul. 19, 2013; 24 pages.
Office Action dated May 13, 2015, 9 pages, U.S. Appl. No. 13/946,773, filed Jul. 19, 2013.
Notice of Allowance dated Mar. 27, 2015; U.S. Appl. No. 13/096,788, filed Apr. 28, 2011; 9 pages.
Office Action dated Jul. 30, 2015, 33 pages, U.S. Appl. No. 13/946,753, filed Jul. 19, 2013.
Office Action dated Aug. 5, 2015, 23 pages, U.S. Appl. No. 13/946,773, filed Jul. 19, 2013.

* cited by examiner

US 9,200,833 B2

HEAVY HYDROCARBON PROCESSING IN NGL RECOVERY SYSTEM

CROSS-REFERENCE TO RELATED APPLICATIONS

The present application is a continuation-in-part of U.S. patent application Ser. No. 13/096,788 filed Apr. 28, 2011, which is a continuation-in-part of U.S. patent application Ser. No. 12/122,336 filed May 16, 2008, which claims priority to U.S. Provisional Patent Application No. 60/938,726 filed May 18, 2007, all of which are incorporated herein by reference as if reproduced in their entirety. The present application also claims priority to U.S. Provisional Patent Application No. 61/730,696 filed Nov. 28, 2012 and U.S. Provisional Application No. 61/823,047 filed May 14, 2013, both of which are incorporated herein by reference as if reproduced in their entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Carbon dioxide ($CO_2$) is a naturally occurring substance in most hydrocarbon subterranean formations. Carbon dioxide also may be used for recovering or extracting oil and hydrocarbons from subterranean formations. One carbon dioxide based recovery process involves injecting carbon dioxide into an injection well, and recovering heavy hydrocarbons and perhaps some of the carbon dioxide from at least one recovery well. Carbon dioxide reinjection process also may produce natural gas liquids (NGLs).

SUMMARY

In one aspect, the disclosure includes a method for processing heavy hydrocarbons in an NGL recovery system. A feed stream is separated into a carbon dioxide recycle stream and a heavy hydrocarbon stream. The heavy hydrocarbon stream comprises carbon dioxide and natural gas liquids, and the heavy hydrocarbon stream comprises heavy hydrocarbons. The carbon dioxide recycle stream is separated into a purified carbon dioxide recycle stream and a natural gas liquids stream. The purified carbon dioxide recycle stream comprises the carbon dioxide, and the natural gas liquids stream comprises the natural gas liquids.

In another aspect, the disclosure includes a set of process equipment comprising a first separator and a second separator. The first separator is configured to separate a feed stream into a recycle stream and a heavy hydrocarbons stream, wherein the recycle stream comprises an injection gas and natural gas liquids, and wherein the heavy hydrocarbons stream comprises heavy hydrocarbons. The second separator is configured to separate the recycle stream into a purified recycle stream and a natural gas liquids stream, wherein the purified recycle stream comprises the injection gas, and wherein the natural gas liquids stream comprises the natural gas liquids.

In yet another aspect, the disclosure includes a system comprising piping, a first separator, and a second separator. The piping is configured to receive a feed stream that comprises an injection gas, $C_3$ to $C_8$ hydrocarbons, and $C_{9+}$ hydrocarbons. The first separator is coupled to the piping and is configured to separate the feed stream into a recycle stream and a heavy hydrocarbons stream, wherein the recycle stream comprises the injection gas and the $C_3$ to $C_8$ hydrocarbons, and wherein the heavy hydrocarbons stream comprises the $C_{9+}$ hydrocarbons. The second separator is configured to receive the recycle stream from the first separator and separate the recycle stream into a purified recycle stream and a natural gas liquids stream, wherein the purified recycle stream comprises the injection gas, and wherein the natural gas liquids stream comprises the $C_3$ to $C_8$ hydrocarbons.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Disclosed herein is an NGL recovery process that may be implemented as part of a carbon dioxide reinjection process to recover NGLs from a carbon dioxide recycle stream. When implementing a carbon dioxide reinjection process, the carbon dioxide is typically injected downhole into an injection well and a stream comprising hydrocarbons and carbon dioxide is generally recovered from a recovery well. The carbon dioxide may be separated from the heavy hydrocarbons and then recycled downhole, e.g., in the reinjection well. In some cases, the carbon dioxide recycle stream may comprise some NGLs, which may be recovered prior to injecting the carbon dioxide recycle stream downhole. The NGL recovery process may be optimized by weighing the NGL recovery rate against the amount of energy expended on NGL recovery.

Figure 1:
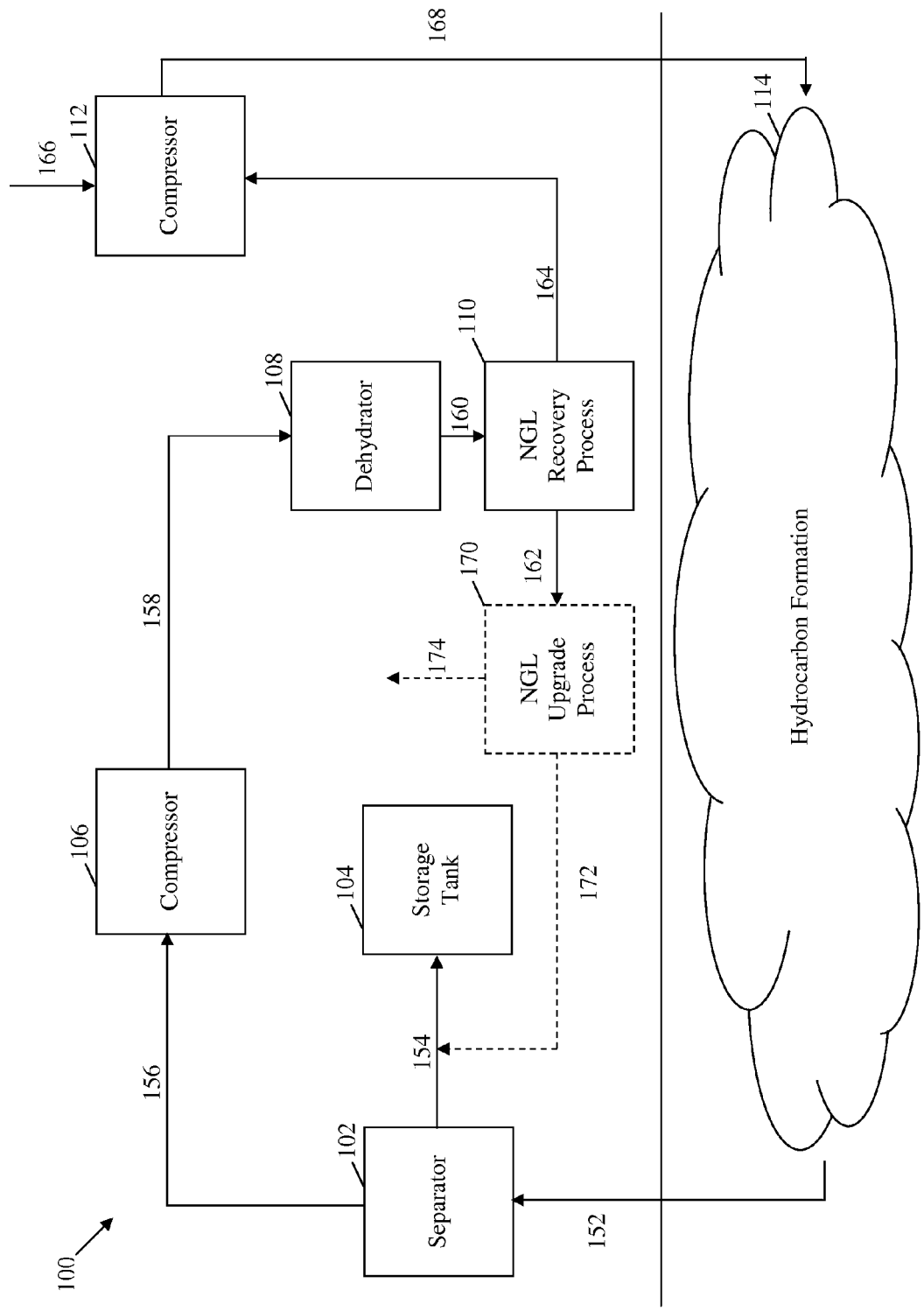
FIG. 1 is a process flow diagram for an embodiment of a carbon dioxide reinjection process.

FIG. 1 illustrates an embodiment of a carbon dioxide reinjection process 100. The carbon dioxide reinjection process 100 may receive hydrocarbons and carbon dioxide from a subterranean hydrocarbon formation 114, separate heavy hydrocarbons and some of the NGLs from the carbon dioxide, and inject the carbon dioxide downhole. As shown in FIG. 1, additional process steps may be included in the carbon dioxide reinjection process, such as compressing the carbon dioxide, dehydrating the carbon dioxide, and/or adding additional carbon dioxide to the carbon dioxide recycle stream. The specific steps in the carbon dioxide reinjection process 100 are explained in further detail below.

The carbon dioxide reinjection process 100 may receive a hydrocarbon feed stream 152 from a subterranean hydrocarbon formation 114. The hydrocarbon feed stream 152 may be obtained from at least one recovery well as indicated by the upward arrow in FIG. 1, but also may be obtained from other types of wells. In addition, the hydrocarbon feed stream 152 may be obtained from the subterranean hydrocarbon formation 114 using any suitable method. For example, if a suitable pressure differential exists between the subterranean hydrocarbon formation 114 and the surface, the hydrocarbon feed stream 152 may flow to the surface via the pressure differential. Alternatively, surface and/or downhole pumps may be used to draw the hydrocarbon feed stream 152 from the subterranean hydrocarbon formation 114 to the surface.

Although the composition of the hydrocarbon feed stream 152 will vary from one location to another, the hydrocarbon feed stream 152 may comprise carbon dioxide, methane, ethane, NGLs, heavy hydrocarbons, hydrogen sulfide ($H_2S$), helium, nitrogen, water, or combinations thereof. The term "hydrocarbon" may refer to any compound comprising, consisting essentially of, or consisting of carbon and hydrogen atoms. The term "natural gas" may refer to any hydrocarbon that may exist in a gas phase under atmospheric or downhole conditions, and includes methane and ethane, but also may include diminishing amounts of $C_3$-$C_8$ hydrocarbons. The term "natural gas liquids" or NGLs may refer to natural gases that may be liquefied without refrigeration, and may include $C_3$-$C_8$ hydrocarbons. Both natural gas and NGL are terms known in the art and are used herein as such. In contrast, the term "heavy hydrocarbons" may refer to any hydrocarbon that may exist in a liquid phase under atmospheric or downhole conditions, and generally includes liquid crude oil, which may comprise $C_{9+}$ hydrocarbons, branched hydrocarbons, aromatic hydrocarbons, and combinations thereof.

The hydrocarbon feed stream 152 may enter a separator 102. The separator 102 may be any process equipment suitable for separating at least one inlet stream into a plurality of effluent streams having different compositions, states, temperatures, and/or pressures. For example, the separator 102 may be a column having trays, packing, or some other type of complex internal structure. Examples of such columns include scrubbers, strippers, absorbers, adsorbers, packed columns, and distillation columns having valve, sieve, or other types of trays. Such columns may employ weirs, downspouts, internal baffles, temperature control elements, and/or pressure control elements. Such columns also may employ some combination of reflux condensers and/or reboilers, including intermediate stage condensers and reboilers. Alternatively, the separator 102 may be a phase separator, which is a vessel that separates an inlet stream into a substantially vapor stream and a substantially liquid stream, such as a knock-out drum, flash drum, reboiler, condenser, or other heat exchanger. Such vessels also may have some internal baffles, temperature control elements, and/or pressure control elements, but generally lack any trays or other type of complex internal structure commonly found in columns. The separator 102 also may be any other type of separator, such as a membrane separator. In a specific embodiment, the separator 102 is a knockout drum. Finally, the separator 102 may be any combination of the aforementioned separators arranged in series, in parallel, or combinations thereof.

The separator 102 may produce a heavy hydrocarbon stream 154 and a carbon dioxide recycle stream 156. The heavy hydrocarbon stream 154 may comprise most of the heavy hydrocarbons from the hydrocarbon feed stream 152. In embodiments, the heavy hydrocarbon stream 154 may comprise at least about 90 percent, at least about 95 percent, at least about 99 percent, or substantially all of the heavy hydrocarbons from the hydrocarbon feed stream 152. The heavy hydrocarbon stream 154 may be sent to a pipeline for transportation or a storage tank 104, where it is stored until being transported to another location or being further processed. In contrast, the carbon dioxide recycle stream 156 may comprise most of the carbon dioxide from the hydrocarbon feed stream 152. In embodiments, the carbon dioxide recycle stream 156 may comprise at least about 90 percent, at least about 95 percent, at least about 99 percent, or substantially all of the carbon dioxide from the hydrocarbon feed stream 152. Similarly, the carbon dioxide recycle stream 156 may comprise at least about 80 percent, at least about 90 percent, at least about 95 percent, or substantially all of the natural gas from the hydrocarbon feed stream 152. All of the percentages referred to herein are molar percentages until otherwise specified.

The carbon dioxide recycle stream 156 may enter a compressor 106. The compressor 106 may be any process equipment suitable for increasing the pressure, temperature, and/or density of an inlet stream. The compressor 106 may be configured to compress a substantially vapor phase inlet stream, a substantially liquid phase inlet stream, or combinations thereof. As such, the term "compressor" may include both compressors and pumps, which may be driven by electrical, mechanical, hydraulic, or pneumatic means. Specific examples of suitable compressors 106 include centrifugal, axial, positive displacement, turbine, rotary, and reciprocating compressors and pumps. In a specific embodiment, the compressor 106 is a turbine compressor. Finally, the compressor 106 may be any combination of the aforementioned compressors arranged in series, in parallel, or combinations thereof.

The compressor 106 may produce a compressed carbon dioxide recycle stream 158. The compressed carbon dioxide recycle stream 158 may contain the same composition as the carbon dioxide recycle stream 156, but at a higher energy level. The additional energy in the compressed carbon dioxide recycle stream 158 may be obtained from energy added to the compressor 106, e.g., the electrical, mechanical, hydraulic, or pneumatic energy. In embodiments, difference in energy levels between the compressed carbon dioxide recycle stream 158 and the carbon dioxide recycle stream 156 is at least about 50 percent, at least about 65 percent, or at least about 80 percent of the energy added to the compressor 106.

The compressed carbon dioxide recycle stream 158 may enter a dehydrator 108. The dehydrator 108 may remove some or substantially all of the water from the compressed carbon dioxide recycle stream 158. The dehydrator 108 may be any suitable dehydrator, such as a condenser, an absorber, or an adsorber. Specific examples of suitable dehydrators 108 include refrigerators, molecular sieves, liquid desiccants such as glycol, solid desiccants such as silica gel or calcium chloride, and combinations thereof. The dehydrator 108 also may be any combination of the aforementioned dehydrators arranged in series, in parallel, or combinations thereof. In a specific embodiment, the dehydrator 108 is a glycol unit. Any water accumulated within or exiting from the dehydrator 108 may be stored, used for other processes, or discarded.

The dehydrator 108 may produce a dehydrated carbon dioxide recycle stream 160. The dehydrated carbon dioxide recycle stream 160 may contain little water, e.g., liquid water or water vapor. In embodiments, the dehydrated carbon dioxide recycle stream 160 may comprise no more than about 5 percent, no more than about 3 percent, no more than about 1 percent, or be substantially free of water.

Figure 2:
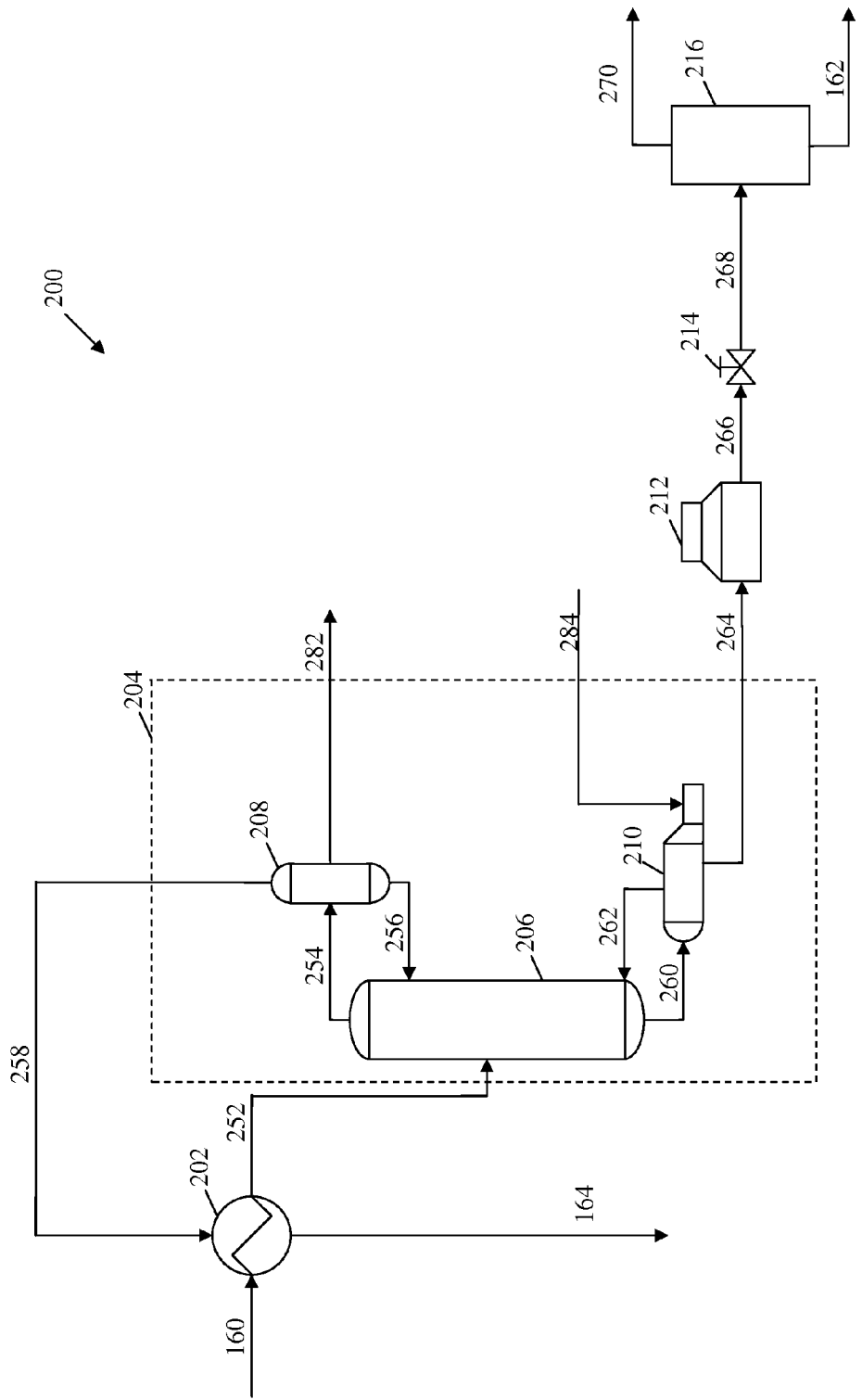
FIG. 2 is a schematic diagram of an embodiment of an NGL recovery process.

The dehydrated carbon dioxide recycle stream 160 may enter an NGL recovery process 110. The NGL recovery process 110 may separate the dehydrated carbon dioxide recycle stream 160 into an NGL rich stream 162 and a purified carbon dioxide recycle stream 164. The NGL rich stream 162 may only comprise a portion of the total NGLs from the dehydrated carbon dioxide recycle stream 160. For example, the NGL rich stream 162 may comprise less than about 70 percent, from about 10 percent to about 50 percent, or from about 20 percent to about 35 percent of the NGLs from the dehydrated carbon dioxide recycle stream 160. By taking a less aggressive cut of the NGLs and/or disregarding the recovery of methane, ethane, and optionally propane from the dehydrated carbon dioxide recycle stream 160, the NGL recovery process 110 may produce a relatively high quality NGL rich stream 162 with relatively little process equipment or energy. A specific example of a suitable NGL recovery process 110 is shown in FIG. 2 and described in further detail below.

As mentioned above, the NGL recovery process 110 may produce a relatively high-quality NGL rich stream 162. Specifically, while the NGL recovery process 110 recovers only a portion, e.g., about 20 to about 35 percent, of the NGLs in the dehydrated carbon dioxide recycle stream 160, the resulting NGL rich stream 162 is relatively lean with respect to methane and the acid gases. For example, the NGL rich stream 162 may comprise most of the butane and heavier components from the dehydrated carbon dioxide recycle stream 160. For example, the NGL rich stream 162 may comprise at least about 90 percent, at least about 95 percent, at least about 99 percent, or substantially all of the $C_{4+}$ from the dehydrated carbon dioxide recycle stream 160. In an embodiment, the NGL rich stream 162 may comprise at least about 20 percent, at least about 40 percent, at least about 60 percent, or at least about 70 percent of the $C_{3+}$ from the dehydrated carbon dioxide recycle stream 160. In embodiments, the NGL rich stream 162 may comprise no more than about 10 percent, no more than about 5 percent, no more than about 1 percent, or be substantially free of ethane. Similarly, the NGL rich stream 162 may comprise no more than about 5 percent, no more than about 3 percent, no more than about 1 percent, or be substantially free of methane. Moreover, the NGL rich stream 162 may comprise no more than about 5 percent, no more than about 3 percent, no more than about 1 percent, or be substantially free of acid gases, such as carbon dioxide or hydrogen sulfide. It will be realized that the composition of the NGL rich stream 162 may be dependent on the dehydrated carbon dioxide recycle stream 160 composition. The examples provided below show the composition of the NGL rich stream 162 for three different dehydrated carbon dioxide recycle stream 160 compositions. The NGL rich stream 162 may be sent to a pipeline for transportation or a storage tank, where it is stored until being transported to another location or being further processed.

In an embodiment, the NGL rich stream 162 optionally may be processed in an NGL upgrade process 170. The NGL upgrade process 170 may produce a relatively heavy NGL stream 172 that may be combined with the heavy hydrocarbon stream 154. When combined, the heavy NGL stream 172 and the heavy hydrocarbon stream 154 may meet or exceed the pipeline and/or transportation thresholds or standards for a heavy hydrocarbon stream, as described in more detail with respect to FIG. 4. A relatively light NGL stream 174 may be sent to a pipeline for transportation or a storage tank, where it may be stored until transported to another location or further processed, as described in more detail with respect to FIG. 4.

Figure 5:
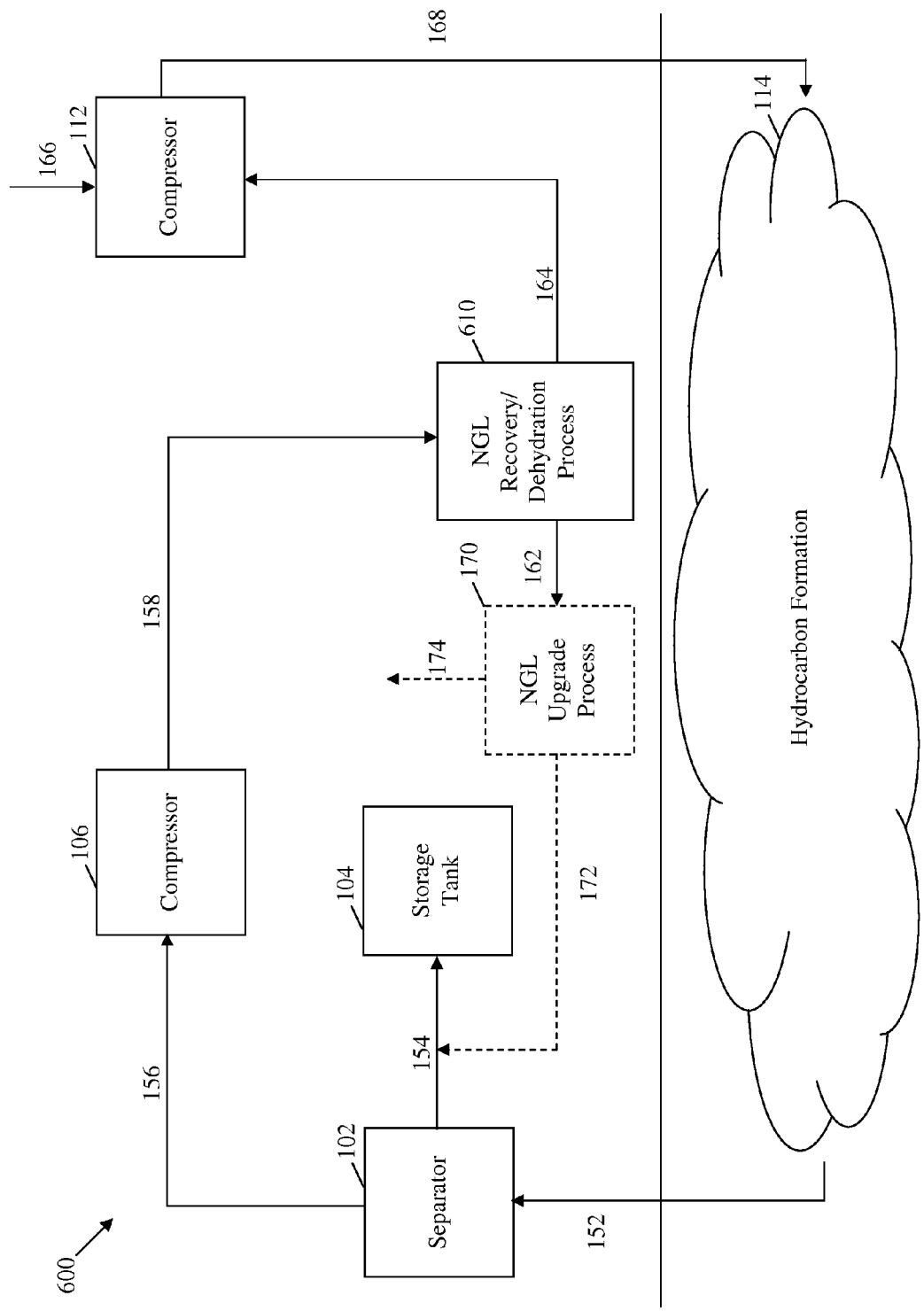
FIG. 5 is a process flow diagram for another embodiment of a reinjection process.

A specific example of a suitable NGL upgrade process 170 is shown in FIG. 5 and described in further detail below.

As mentioned above, the NGL recovery process 110 may produce a purified carbon dioxide recycle stream 164. The purified carbon dioxide recycle stream 164 may comprise most of the carbon dioxide from the dehydrated carbon dioxide recycle stream 160, as well as some other components such as methane, ethane, propane, butane, nitrogen, and hydrogen sulfide. In embodiments, the purified carbon dioxide recycle stream 164 may comprise at least about 90 percent, at least about 95 percent, at least about 99 percent, or substantially all of the carbon dioxide from the dehydrated carbon dioxide recycle stream 160. In addition, the purified carbon dioxide recycle stream 164 may comprise at least about 90 percent, at least about 95 percent, at least about 99 percent, or substantially all of the methane from the dehydrated carbon dioxide recycle stream 160. As such, the purified carbon dioxide recycle stream 164 may comprise at least about 65 percent, at least about 80 percent, at least about 90 percent, or at least about 95 percent carbon dioxide. In embodiments, the purified carbon dioxide recycle stream 164 may comprise no more than about 10 percent, no more than about 5 percent, no more than about 1 percent, or be substantially free of $C_{3+}$. Similarly, the purified carbon dioxide recycle stream 164 may comprise no more than about 20 percent, no more than about 10 percent, no more than about 5 percent, or be substantially free of $C_{2+}$.

The purified carbon dioxide recycle stream 164 may enter a compressor 112. The compressor 112 may comprise one or more compressors, such as the compressor 106 described above. In a specific embodiment, the compressor 112 is a turbine compressor. The compressor 112 may compress the purified carbon dioxide recycle stream 164, thereby producing a carbon dioxide injection stream 168. The carbon dioxide injection stream 168 may contain the same composition as the purified carbon dioxide recycle stream 164, but at a higher energy level. The additional energy in the carbon dioxide injection stream 168 may be obtained from energy added to the compressor 112, e.g., the electrical, mechanical, hydraulic, or pneumatic energy. In some embodiments, the difference in energy levels between the carbon dioxide injection stream 168 and the purified carbon dioxide recycle stream 164 is at least about 50 percent, at least about 65 percent, or at least about 80 percent of the energy added to the compressor 112.

In some embodiments, a makeup stream 166 may be combined with either the purified carbon dioxide recycle stream 164 or the carbon dioxide injection stream 168. Specifically, as the carbon dioxide reinjection process 100 is operated, carbon dioxide and other compounds will be lost, e.g., by replacing the hydrocarbons in the subterranean hydrocarbon formation 114, by leakage into inaccessible parts of the subterranean hydrocarbon formation 114, and/or to other causes. Alternatively, it may be desirable to increase the amount of carbon dioxide and other compounds injected downhole. As such, the makeup stream 166 may be combined with either the purified carbon dioxide recycle stream 164 and/or the carbon dioxide injection stream 168, for example in the compressor 112. Alternatively or additionally, the makeup stream 166 may be combined with the carbon dioxide recycle stream 156, the compressed carbon dioxide recycle stream 158, the dehydrated carbon dioxide recycle stream 160, or combinations thereof. The makeup stream 166 may comprise carbon dioxide, nitrogen, methane, ethane, air, water, or any other suitable compound. In an embodiment, the makeup stream 166 comprises at least 75 percent, at least 85 percent, or at least 95 percent carbon dioxide, nitrogen, methane, air, water, or combinations thereof Finally, the carbon dioxide injection stream 168 may be sent to a carbon dioxide pipeline rather than being immediately injected downhole. In such a case, the carbon dioxide injection stream 168 may meet the carbon dioxide pipeline specifications. One example of a carbon dioxide pipeline specification is: at least about 95 percent carbon dioxide, substantially free of water, no more than about 30 pounds of vapor-phase water per million cubic feet (mmcf) of product, no more than about 20 parts per million (ppm) by weight of hydrogen sulfide, no more than about 35 ppm by weight of total sulfur, a temperature of no more than about 120° F., no more than about 4 percent nitrogen, no more than about 5 percent hydrocarbons (wherein the hydrocarbons do not have a dew point exceeding about −20° F.), no more than about 10 ppm by weight of oxygen, and more than about 0.3 gallons of glycol per mmcf of product (wherein the glycol is not in the liquid state at the pressure and temperature conditions of the pipeline).

FIG. 2 illustrates an embodiment of an NGL recovery process 200. The NGL recovery process 200 may recover some of the NGLs from a carbon dioxide recycle stream described above. For example, the NGL recovery process 200 may be implemented as part of the carbon dioxide reinjection process 100, e.g., by separating the dehydrated carbon dioxide recycle stream 160 into an NGL rich stream 162 and a purified carbon dioxide recycle stream 164. Alternatively, the NGL recovery process 200 may be implemented as a stand-alone process for recovering NGLs from a hydrocarbon containing stream.

The NGL recovery process 200 may begin by cooling the dehydrated carbon dioxide recycle stream 160 in a heat exchanger 202. The heat exchanger 202 may be any equipment suitable for heating or cooling one stream using another stream. Generally, the heat exchanger 202 is a relatively simple device that allows heat to be exchanged between two fluids without the fluids directly contacting each other. Examples of suitable heat exchangers 202 include shell and tube heat exchangers, double pipe heat exchangers, plate fin heat exchangers, bayonet heat exchangers, reboilers, condensers, evaporators, and air coolers. In the case of air coolers, one of the fluids comprises atmospheric air, which may be forced over tubes or coils using one or more fans. In a specific embodiment, the heat exchanger 202 is a shell and tube heat exchanger.

As shown in FIG. 2, the dehydrated carbon dioxide recycle stream 160 may be cooled using the cooled, purified carbon dioxide recycle stream 258. Specifically, the dehydrated carbon dioxide recycle stream 160 is cooled to produce the cooled carbon dioxide recycle stream 252, and the cooled, purified carbon dioxide recycle stream 258 is heated to produce the purified carbon dioxide recycle stream 164. The efficiency of the heat exchange process depends on several factors, including the heat exchanger design, the temperature, composition, and flowrate of the hot and cold streams, and/or the amount of thermal energy lost in the heat exchange process. In embodiments, the difference in energy levels between the dehydrated carbon dioxide recycle stream 160 and the cooled carbon dioxide recycle stream 252 is at least about 60 percent, at least about 70 percent, at least about 80 percent, or at least about 90 percent of the difference in energy levels between the cooled, purified carbon dioxide recycle stream 258 and the purified carbon dioxide recycle stream 164.

The cooled carbon dioxide recycle stream 252 then enters an NGL stabilizer 204. The NGL stabilizer 204 may comprise a separator 206, a condenser 208, and a reboiler 210. The separator 206 may be similar to any of the separators described herein, such as separator 102. In a specific embodiment, the separator 206 is a distillation column. The condenser 208 may receive an overhead 254 from the separator 206 and produce the cooled, purified carbon dioxide recycle stream 258 and a reflux stream 256, which is returned to the separator 206. The condenser 208 may be similar to any of the heat exchangers described herein, such as heat exchanger 202. In a specific embodiment, the condenser 208 is a shell and tube, kettle type condenser coupled to a refrigeration process, and contains a reflux accumulator. As such, the condenser 208 may remove some energy 282 from the reflux stream 256 and cooled, purified carbon dioxide recycle stream 258, typically by refrigeration. The cooled, purified carbon dioxide recycle stream 258 is substantially similar in composition to the purified carbon dioxide recycle stream 164 described above. Similarly, the reboiler 210 may receive a bottoms stream 260 from the separator 206 and produce a sour NGL rich stream 264 and a boil-up stream 262, which is returned to the separator 206. The reboiler 210 may be like any of the heat exchangers described herein, such as heat exchanger 202. In a specific embodiment, the reboiler 210 is a shell and tube heat exchanger coupled to a hot oil heater. As such, the reboiler 210 adds some energy 284 to the boil-up stream 262 and the sour NGL rich stream 264, typically by heating. The sour NGL rich stream 264 may be substantially similar in composition to the NGL rich stream 162, with the exception that the sour NGL rich stream 264 has some additional acid gases, e.g., acid gases 270 described below.

The sour NGL rich stream 264 then may be cooled in another heat exchanger 212. The heat exchanger 212 may be like any of the heat exchangers described herein, such as heat exchanger 202. For example, the heat exchanger 212 may be an air cooler as described above. A cooled, sour NGL rich stream 266 may exit the heat exchanger 212 and enter a throttling valve 214. The throttling valve 214 may be an actual valve such as a gate valve, globe valve, angle valve, ball valve, butterfly valve, needle valve, or any other suitable valve, or may be a restriction in the piping such as an orifice or a pipe coil, bend, or size reduction. The throttling valve 214 may reduce the pressure, temperature, or both of the cooled, sour NGL rich stream 266 and produce a low-pressure sour NGL rich stream 268. The cooled, sour NGL rich stream 266 and the low-pressure sour NGL rich stream 268 have substantially the same composition as the sour NGL rich stream 264, albeit with lower energy levels.

The low-pressure sour NGL rich stream 268 then may be sweetened in a separator 216. The separator 216 may be similar to any of the separators described herein, such as separators 102 or 206. In an embodiment, the separator 216 may be one or more packed columns that use a sweetening process to remove acid gases from the low-pressure sour NGL rich stream 268. Suitable sweetening processes include amine solutions, physical solvents such as SELEXOL or RECTISOL, mixed amine solution and physical solvents, potassium carbonate solutions, direct oxidation, absorption, adsorption using, e.g., molecular sieves, or membrane filtration. The separator 216 may produce the NGL rich stream 162 described above. In addition, any acid gases 270 accumulated within or exiting from the separator 216 may be stored, used for other processes, or suitably disposed of. Finally, while FIGS. 1 and 2 are described in the context of carbon dioxide reinjection, it will be appreciated that the concepts described herein can be applied to other reinjection processes, for example those using nitrogen, air, or water.

Figure 3:
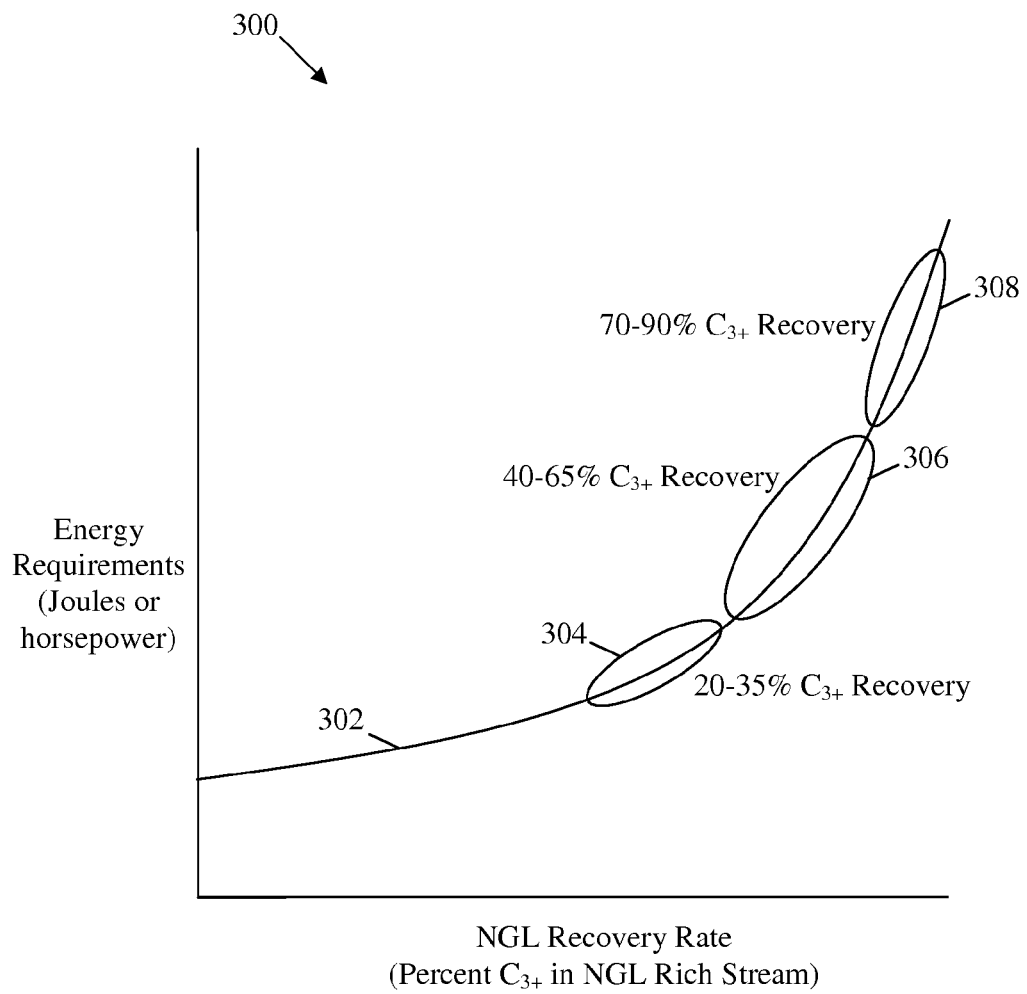
FIG. 3 is a chart depicting an embodiment of the relationship between the NGL recovery rate and the energy requirement.

FIG. 3 illustrates an embodiment of a chart 300 depicting the relationship between the NGL recovery rate and the energy expended to recover NGLs in the NGL recovery process. The NGL recovery rate may be a percentage recovery, and may represent the amount of $C_{3+}$ in the carbon dioxide recycle stream that is recovered in the NGL rich stream. The energy requirement may be measured in joules (J) or in horsepower (hp), and may represent the energy required to generate the condenser energy and reboiler energy described above. If additional compressors are needed at any point in the carbon dioxide reinjection process than would be required in an otherwise similar carbon dioxide reinjection process that lacks the NGL recovery process, then the energy required to operate such compressors may be included in the energy requirement shown in FIG. 3.

As shown by curve 302, the energy requirements may increase about exponentially as the NGLs are recovered at higher rates. In other words, substantially higher energy may be required to recover the NGLs at incrementally higher rates. For example, recovering a first amount 304 of from about 20 percent to about 35 percent of $C_{3+}$ may require substantially less energy than recovering a second amount 306 of from about 40 percent to about 65 percent of $C_{3+}$. Moreover, recovering the second amount 306 of from about 40 percent to about 65 percent of $C_{3+}$ may require substantially less energy than recovering a third amount 308 of from about 70 percent to about 90 percent of $C_{3+}$. Such significant reduction in energy requirements may be advantageous in terms of process feasibility and cost, where relatively small decreases in NGL recovery rates may require significantly less energy and process equipment, yielding significantly better process economics. Although the exact relationship of the curve 302 may depend on numerous factors especially the price of $C_{3+}$, in an embodiment the economics of the NGL recovery process when the NGL recovery rate is in the second amount 306 may be better than the economics of the NGL recovery process when the NGL recovery rate is in the third amount 308. Similarly, the economics of the NGL recovery process when the NGL recovery rate is in the first amount 304 may be significantly better than the economics of the NGL recovery process when the NGL recovery rate is in the second amount 306. Such a relationship is counterintuitive considering that in many other processes, the process economics generally improve with increased recovery rates.

Figure 4:
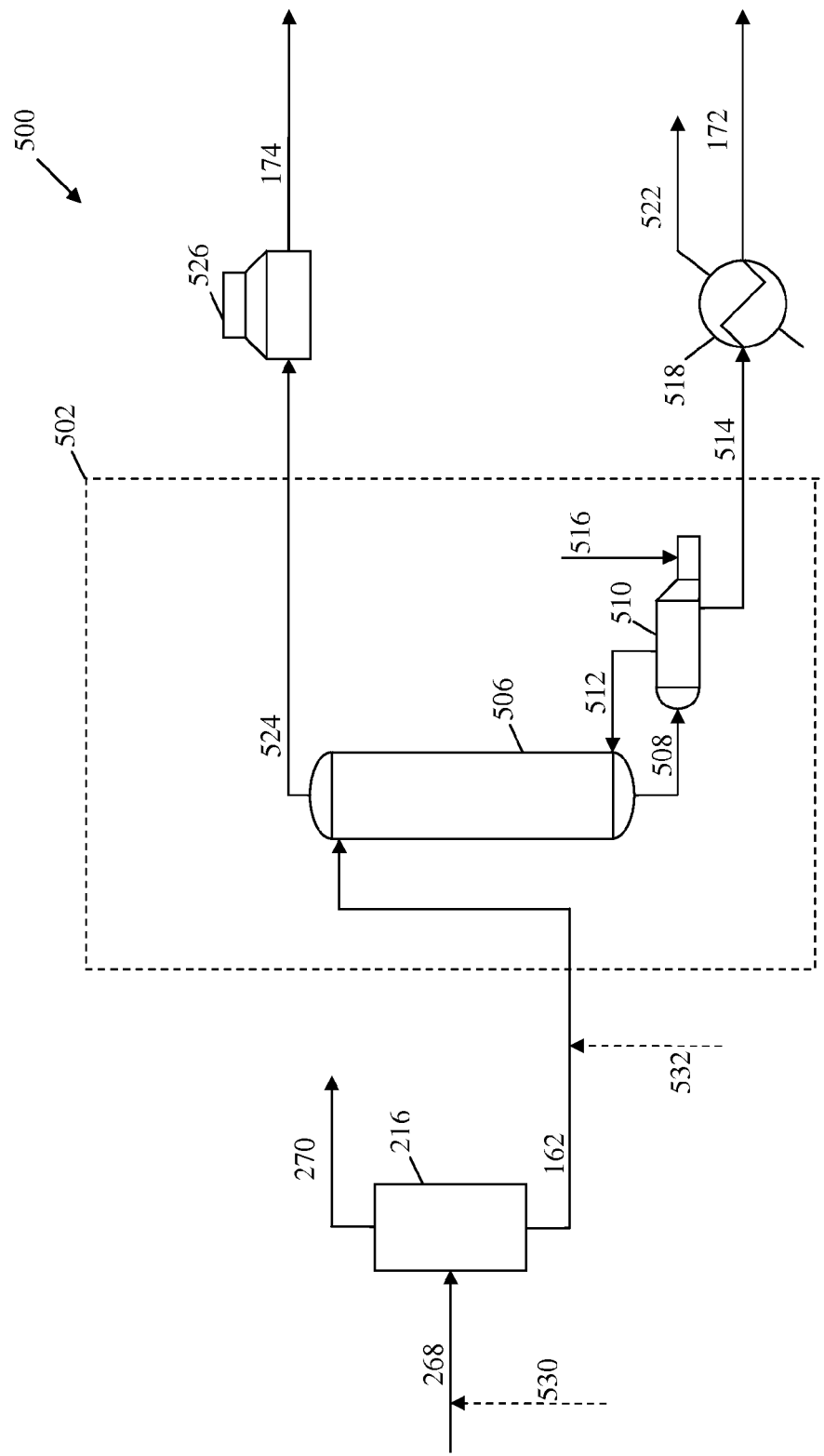
FIG. 4 is a schematic diagram of an embodiment of an NGL upgrade process.

FIG. 4 illustrates an embodiment of an NGL upgrade process 500. The NGL upgrade process 500 may separate a portion of the heavier components of the NGL rich stream 162 for blending with the heavy hydrocarbon stream 154. For example, the NGL upgrade process 500 may be used to produce a relatively heavy NGL stream 172 for combining with the heavy hydrocarbon stream 154 and a relatively light NGL stream 174 that may be sold and/or used as an NGL product. In general, the heavy hydrocarbon stream 154 may sell for a higher price than the NGL rich stream 162. By mixing at least a portion of the NGL rich stream 162 with the heavy hydrocarbon stream 154, the NGL upgrade process 500 may be used to improve the economics and/or revenue from the NGL recovery process. As a result, the NGL upgrade process 500 may be considered in the NGL recovery optimization method 400 described in more detail below.

The NGL upgrade process 500 may begin by passing the NGL rich stream 162 into an NGL upgrade unit 502. The NGL rich stream 162 may be in the liquid phase after passing through separator 216. The NGL upgrade unit 502 may comprise a separator 506, and a reboiler 510. While not illustrated in FIG. 4, some embodiments of the NGL upgrade unit 502 also may comprise a condenser. The separator 506 may be similar to any of the separators described herein, such as separator 102. In a specific embodiment, the separator 506 is a stripping column with a partial reboiler 510, and the separator 506 may not comprise a condenser. The downcoming liquid phase may be provided by the liquid NGL rich stream 162, which may be introduced at or near the top of the separator 506. In an embodiment, a condenser may be used to at least partially condense overhead stream 524 to produce at least a portion of the downcoming liquid in separator 506. For example, the condenser may be similar to any of the heat exchangers described herein, such as heat exchanger 202. The reboiler 510 may receive a bottoms stream 508 from the separator 506 and produce a heavy NGL stream 514 and a boil-up stream 512, which is returned to the separator 506 to provide the rising vapor phase within the separator 506. The reboiler 510 may be like any of the heat exchangers described herein, such as heat exchanger 202. In a specific embodiment, the reboiler 510 is a shell and tube heat exchanger coupled to a hot oil heater. As such, the reboiler 510 adds some energy 516 to the boil-up stream 512 and the heavy NGL stream 514, typically by heating. The heavy NGL stream 514 may be substantially similar in composition to the heavy NGL stream 172.

The heavy NGL stream 514 then may be cooled in a heat exchanger 518. The heat exchanger 518 may be any equipment suitable for heating or cooling one stream using another stream. Generally, the heat exchanger 518 is a relatively simple device that allows heat to be exchanged between two fluids without the fluids directly contacting each other (i.e., indirect heat exchange). In an embodiment, heat integration that comprises using one or more streams in the overall process to cool the heavy NGL stream 514, and thereby heating the one or more streams, may be used with heat exchanger 518. Examples of suitable heat exchangers 518 include shell and tube heat exchangers, double pipe heat exchangers, plate fin heat exchangers, bayonet heat exchangers, reboilers, condensers, evaporators, and air coolers. In the case of air coolers, one of the fluids comprise atmospheric air, which may be forced over tubes or coils using one or more fans. In a specific embodiment, the heat exchanger 518 is a shell and tube heat exchanger with the heavy NGL stream 514 passing on one side of the exchanger and a cooling fluid stream 522 passing on the other side. The cooled, heavy NGL stream 172 may have substantially the same composition as the heavy NGL stream 514, albeit with lower energy levels.

The overhead stream 524 from separator 506 may comprise at least a portion of the lighter NGL components and may be cooled in another heat exchanger 526. The heat exchanger 526 may be like any of the heat exchangers described herein, such as heat exchanger 202. For example, the heat exchanger 526 may be an air cooler as described above. The cooled, light NGL stream 174 may have substantially the same composition as the overhead stream 524, albeit with lower energy levels.

As shown in FIG. 4, one or more additional NGL input streams 530, 532 may be introduced into the NGL upgrade process 500 upstream of the NGL upgrade unit 502. The additional NGL input streams 530, 532 may comprise NGL streams from any suitable source, such as one or more additional recovery plants. The NGL input streams 530, 532 may be transported to the NGL upgrade unit 502 by any suitable means. For example, the NGL input streams 530, 532 may be transported to the NGL upgrade unit 502 through a pipeline or by truck. The additional NGL input streams 530, 532 may contain one or more acid gases and/or other contaminants. Depending on their compositions, the additional NGL input streams 530, 532 may be introduced at various input locations in the NGL recovery process. For example, an input location may comprise a point upstream of the separator 216 for an NGL input stream 530 comprising acid gas components at or above a threshold level (e.g., a pipeline or storage threshold), thereby allowing for sweetening prior to being introduced to the downstream processes. As another example, an input location for an NGL input stream 532 that comprises acid gas components below the threshold level may comprise a point downstream of the separator 216, thereby reducing the energy use of the overall recovery process. The use of one or more additional input streams may allow an NGL upgrade process 500 to upgrade the NGL streams from a plurality of NGL recovery processes. For example, multiple NGL recovery processes and/or additional sources of NGL rich streams may feed the NGL product to an NGL upgrade process, thereby reducing the need to install an NGL upgrade process at each source of an NGL stream.

In general, the NGL upgrade process may be used to separate a relatively heavy NGL stream 172 for blending with the heavy hydrocarbon stream 154. The composition and flowrate of the heavy NGL stream 172 may vary depending on the composition and flowrate of the heavy hydrocarbon stream 154. As discussed above, the heavy hydrocarbon stream 154 may be sent to a pipeline for transportation or a storage tank, where it is stored until being transported to another location or being further processed. Each of the downstream uses for the heavy hydrocarbon stream 154 may have one or more thresholds and/or standards that the heavy hydrocarbon stream 154 must meet in order to be transported or further processed. For example, pipelines may generally have standards setting thresholds for fluids passing through the pipeline, such as thresholds on vapor pressure (e.g., expressed as a Reid vapor pressure standard), carbon dioxide content, acid gas content (e.g., hydrogen sulfide content), and water content (e.g., a dew point standard). In an embodiment, the fluid transported in the pipeline may have a Reid vapor pressure of no more than about 20, no more than about 15, or no more than about 10. Accordingly, the composition and the flowrate of the heavy NGL stream 172 may be controlled so that the heavy hydrocarbon stream 154 may meet the transportation and/or further processing standards and/or threshold downstream of the mixing point between the heavy hydrocarbon stream 154 and the heavy NGL stream 172.

In an embodiment, the composition and/or flowrate of the heavy NGL stream 172 and the light NGL stream 174 may be controlled, at least in part, to allow the light NGL stream 174 to satisfy one or more transportation thresholds. The light NGL stream 174 may be transported using a variety of transportation means and/or methods including, but not limited to, a pipeline and a tanker truck. Each transportation method may have one or more thresholds that the light NGL stream 174 may need to satisfy prior to being accepted for transportation. For example, a pipeline may have a heating value standard of between about 1,000 British thermal units per cubic foot (Btu/ft$^3$) and about 1,200 Btu/ft$^3$, or alternatively between about 1,050 Btu/ft$^3$ and about 1,100 Btu/ft$^3$. In an embodiment, the light NGL stream 174 also may be subject to a dew point standard. As another example, tanker truck transportation may have a vapor pressure requirement that the light NGL stream 174 not exceed a vapor pressure of about 250 pounds per square inch gauge (psig) at a temperature of 100° F. Based on the applicable thresholds, the composition and the flowrate of the heavy NGL stream 172 and the light NGL stream 174 may be controlled so that the light NGL stream 174 may meet the transportation thresholds, allowing the light NGL stream 174 to be transported for further use.

FIG. 5 illustrates another embodiment of a carbon dioxide reinjection process 600. The process shown in FIG. 5 and the process of FIG. 1 are similar, and those portions with similar numbering are described in more detail with respect to FIG. 1 above. In the interest of brevity, only those portions that differ from FIG. 1 will be discussed with respect to FIG. 5.

As can be seen in FIG. 5, the dehydration of the compressed carbon dioxide recycle stream 158 may be integrated with the NGL recovery/dehydration process 610. The compressed carbon dioxide recycle stream 158 may enter an NGL recovery/dehydration process 610. In an embodiment, the NGL recovery/dehydration process 610 may comprise a separator 102 that produces multiple streams and allow one or more phases of the compressed carbon dioxide recycle stream 158 to be dehydrated without dehydrating the entirety of the compressed carbon dioxide recycle stream 158. This may allow for a reduction in the size of the dehydration unit and a reduction in the operating expense associated with the dehydrator. Further, the separate processing of the phases may allow the downstream processing units to receive each phase at a different location, which may further improve the process economics as described in more detail below with respect to FIG. 7.

The compressed carbon dioxide recycle stream 158 may enter the NGL recovery/dehydration process 610. The NGL recovery/dehydration process 610 may dehydrate, process, and separate the compressed carbon dioxide recycle stream 158 into an NGL rich stream 162 and a purified carbon dioxide recycle stream 164. The NGL rich stream 162 may only comprise a portion of the total NGLs from the dehydrated carbon dioxide recycle stream 160. A specific example of a suitable NGL recovery/dehydration process 610 is shown in FIG. 6 and described in further detail below.

As mentioned above, the NGL recovery/dehydration process 610 may produce a relatively high-quality NGL rich stream 162. The NGL rich stream 162 may have about the same composition as the NGL rich stream 162 in FIG. 1. The NGL rich stream 162 may be sent to a pipeline for transportation or a storage tank, where it is stored until transported to another location or further processed. In an embodiment, the NGL rich stream optionally may be processed in an NGL upgrade process 170, as described in more detail above. The NGL upgrade process 170 may produce a relatively heavy NGL stream 172 that may be combined with the heavy hydrocarbon stream 154. When combined, the heavy NGL stream 172 and the heavy hydrocarbon stream 154 may meet or exceed the pipeline and/or transportation properties for a heavy hydrocarbon stream. A relatively light NGL stream 174 may be sent to a pipeline for transportation or a storage tank 104, where it may be stored until being transported to another location or being further processed. A specific example of a suitable NGL upgrade process 170 is shown in FIG. 4 and described in further detail above.

As mentioned above, the NGL recovery/dehydration process 610 may produce a purified carbon dioxide recycle stream 164. The purified carbon dioxide recycle stream 164 may have about the same composition as the purified carbon dioxide recycle stream 164 in FIG. 1. The purified carbon dioxide recycle stream 164 may enter a compressor 112. The compressor 112 may comprise one or more compressors, such as the compressor 106 described above. In some embodiments, a makeup stream 166 may be combined with either the purified carbon dioxide recycle stream 164 or the carbon dioxide injection stream 168. The resulting carbon dioxide injection stream 168 then may be injected into the subterranean hydrocarbon formation 114 or sent to a carbon dioxide pipeline.

Figure 6:
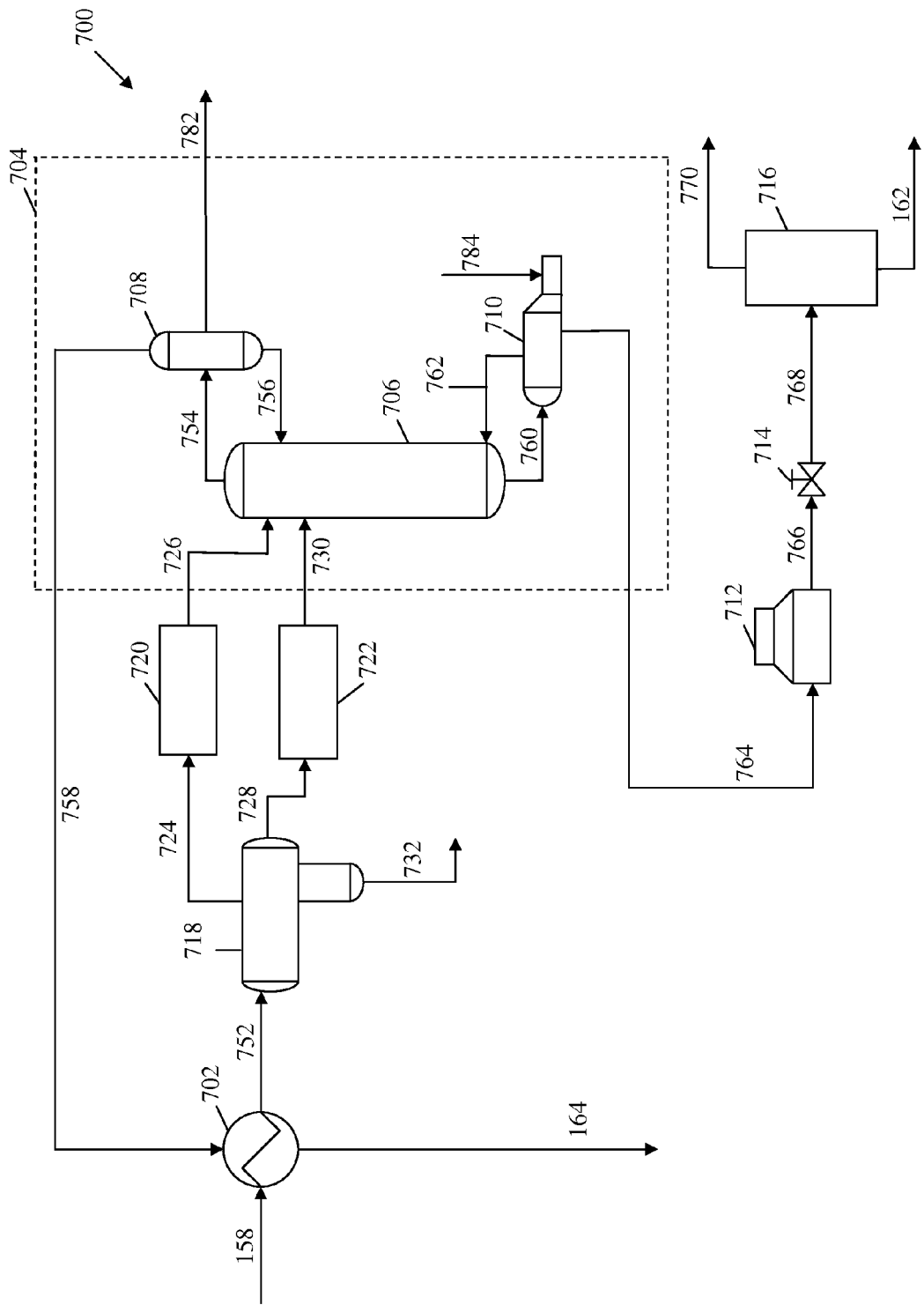
FIG. 6 is a schematic diagram of another embodiment of an NGL recovery process.

FIG. 6 illustrates an embodiment of an NGL recovery/dehydration process 700. The NGL recovery/dehydration process 700 may dehydrate and recover some of the NGLs from a carbon dioxide recycle stream. For example, the NGL recovery/dehydration process 700 may be implemented as part of the carbon dioxide reinjection process 600, e.g., by separating the dehydrated carbon dioxide recycle stream 160 into an NGL rich stream 162 and a purified carbon dioxide recycle stream 164.

The NGL recovery process 700 may begin by cooling the compressed carbon dioxide recycle stream 158 in a heat exchanger 702. The heat exchanger 702 may be any equipment suitable for heating or cooling one stream using another stream. Generally, the heat exchanger 702 is a relatively simple device that allows heat to be exchanged between two fluids without the fluids directly contacting each other. Examples of suitable heat exchangers 702 include shell and tube heat exchangers, double pipe heat exchangers, plate fin heat exchangers, bayonet heat exchangers, reboilers, condensers, evaporators, and air coolers. In the case of air coolers, one of the fluids comprises atmospheric air, which may be forced over tubes or coils using one or more fans. In a specific embodiment, the heat exchanger 702 is a shell and tube heat exchanger.

As shown in FIG. 6, the compressed carbon dioxide recycle stream 158 may be cooled using the cooled, purified carbon dioxide recycle stream 758. Specifically, the compressed carbon dioxide recycle stream 158 is cooled to produce the cooled carbon dioxide recycle stream 752, and the cooled, purified carbon dioxide recycle stream 758 is heated to produce the purified carbon dioxide recycle stream 164. The efficiency of the heat exchange process depends on several factors, including the heat exchanger design, the temperature, composition, and flowrate of the hot and cold streams, and/or the amount of thermal energy lost in the heat exchange process. In embodiments, the difference in energy levels between the compressed carbon dioxide recycle stream 158 and the cooled carbon dioxide recycle stream 752 is at least about 60 percent, at least about 70 percent, at least about 80 percent, or at least about 90 percent of the difference in energy levels between the cooled, purified carbon dioxide recycle stream 758 and the purified carbon dioxide recycle stream 164.

The cooled carbon dioxide recycle stream 752 then enters a separator 718. The separator 718 may be similar to any of the separators described herein, such as separator 102. In a specific embodiment, the separator 718 is a three-phase separator, which is a vessel that separates an inlet stream into three distinct phases such as a substantially vapor stream, a substantially first liquid stream (e.g., an organic liquid phase), and a substantially second liquid stream (e.g., an aqueous liquid phase). The first liquid stream may primarily comprise hydrocarbons and the second liquid stream may primarily comprise an aqueous fluid so that the first and second liquid streams are at least partially insoluble in each other and form two separable liquid phases. A three-phase separator may have some internal baffles and/or weirs, temperature control elements, and/or pressure control elements, but generally lacks any trays or other type of complex internal structure commonly found in columns. In an embodiment, the separator 718 may separate the cooled carbon dioxide recycle stream 752 into a vapor recycle stream 724, a liquid recycle stream 728, and an aqueous fluid stream 732. The aqueous fluid stream 732 exiting from the dehydrator 722 may be stored, used for other processes, or discarded. The aqueous fluid stream 732 may first be treated to remove a portion of any hydrocarbons in the stream prior to storage, further use or process, or being discarded.

The vapor recycle stream 724 optionally may enter a dehydrator 720. The dehydrator 720 may remove some or substantially all of the water from the vapor recycle stream 724. The dehydrator 720 may be any suitable dehydrator, such as a condenser, an absorber, or an adsorber. Specific examples of suitable dehydrators 720 include refrigerators, molecular sieves, liquid desiccants such as glycol, solid desiccants such as silica gel or calcium chloride, and combinations thereof. The dehydrator 720 also may be any combination of the aforementioned dehydrators 720 and 722 arranged in series, in parallel, or combinations thereof. In a specific embodiment, the dehydrator 720 is a glycol unit. Any water accumulated within or exiting from the dehydrator 720 may be stored, used for other processes, or discarded.

The dehydrator 720 may produce a dehydrated vapor recycle stream 726. The dehydrated vapor recycle stream 726 may contain little water, e.g., liquid water or water vapor. In embodiments, the dehydrated vapor recycle stream 726 may comprise no more than about 5 percent, no more than about 3 percent, no more than about 1 percent, or be substantially free of water.

The liquid recycle stream 728 from the separator 718 optionally may enter a dehydrator 722. The dehydrator 722 may remove some or substantially all of the water from the liquid recycle stream 728. The dehydrator 722 may be any suitable dehydrator, such as a condenser, an absorber, or an adsorber. Suitable liquid-liquid separators such as hydro-cyclones and heater treaters also may be used. In an embodiment, the water in the liquid recycle stream 728 may be in the form of hydrates (e.g., clathrate hydrates) and/or an emulsion. Suitable separators utilizing physical solvents, chemical solvents, and or heat may be used to break the hydrates and/or emulsion and separate the water from the remaining liquid recycle stream 728 components. Specific examples of suitable dehydrators 722 include hydro-cyclones, heater treaters, molecular sieves, liquid desiccants such as glycol, solid desiccants such as silica gel or calcium chloride, and combinations thereof. The dehydrator 722 also may be any combination of the aforementioned dehydrators 722 arranged in series, in parallel, or combinations thereof. Any water accumulated within or exiting from the dehydrator 722 may be stored, used for other processes, or discarded.

The dehydrator 722 may produce a dehydrated liquid recycle stream 730. The dehydrated liquid recycle stream 730 may contain little water, e.g., liquid water or water vapor. In embodiments, the dehydrated liquid recycle stream 730 may comprise no more than about 5 percent, no more than about 3 percent, no more than about 1 percent, or be substantially free of water.

In an embodiment, only one of the dehydrators 720, 722 may be used. For example, any water contained in the cooled carbon dioxide recycle stream 752 may preferentially distribute to the vapor recycle stream 724 or the liquid recycle stream 728. By only using one separator 720, 722 on the stream containing the majority of the water, the dehydration requirements may be reduced, thereby reducing both the installation and operating costs associated with operating the dehydration system. In an embodiment in which only one dehydrator is used, the remaining stream may pass directly from the separator 718 to the separator 706. In an embodiment, both dehydrators 720, 722 may be used, and dehydrators 720, 722 may comprise different types of dehydrators. For example, dehydrator 720 may comprise a gas dehydration system while dehydrator 722 may comprise a unit designed to primarily perform a liquid-liquid phase separation. In an embodiment, both dehydrators 720, 722 may be used and the separator 718 may be used to perform a first stage separation of any free water, thereby reducing the dehydration requirements. In still another embodiment, neither dehydrator 720, 722 may be used and rather separator 718 may be sufficient for removing any free water and thereby dehydrating the cooled carbon dioxide recycle stream 752 along with performing a first stage flash of the cooled carbon dioxide recycle stream 752 to allow the stream to be introduced to the NGL fractionator 704 as separate streams. In yet another embodiment, the vapor recycle stream 724 and the liquid recycle stream 728 may be combined and passed to a single dehydrator.

The dehydrated vapor recycle stream 726 and the dehydrated liquid recycle stream 730 then may enter an NGL fractionator 704 as separate streams. In an embodiment, the dehydrated vapor recycle stream 726 and the dehydrated liquid recycle stream 730 may be fed to a separator 706 in the NGL fractionator 704 at separate input locations. The ability to feed the dehydrated vapor recycle stream 726 and the dehydrated liquid recycle stream 730 at separate locations in the separator 706 may aid in the separation of the various components into the overhead stream 754 and the bottoms stream 760. While the dehydrated vapor recycle stream 726 is illustrated as entering the separator 706 above the dehydrated liquid recycle stream 730, the dehydrated vapor recycle stream 726 may entering the separator 706 below the dehydrated liquid recycle stream 730, or enter at or near the same tray and/or location. In an embodiment, the dehydrated vapor recycle stream 726 and the dehydrated liquid recycle stream 730 may be combined prior to entering the NGL fractionator 704.

The NGL fractionator 704 may comprise a separator 706, a condenser 708, and a reboiler 710. The separator 706 may be similar to any of the separators described herein, such as separator 102. In a specific embodiment, the separator 706 is a distillation column. In an embodiment, dehydrated vapor recycle stream 726 may be introduced onto the tray and/or inlet location (e.g., when structured packing is used) with the closest matching vapor composition in the distillation column. Similarly, the dehydrated liquid recycle stream 730 may be introduced onto the tray and/or inlet location with the closest matching liquid composition. Actual compositional measurements and/or process models may be used to match the dehydrated vapor recycle stream 726 and the dehydrated liquid recycle stream 730 to the appropriate trays and/or inlet location in the distillation column.

The condenser 708 may receive an overhead stream 754 from the separator 706 and produce the cooled, purified carbon dioxide recycle stream 758 and a reflux stream 756, which is returned to the separator 706. The condenser 708 may be similar to any of the heat exchangers described herein, such as heat exchanger 702. In a specific embodiment, the condenser 708 is a shell and tube, kettle type condenser coupled to a refrigeration process, and contains a reflux accumulator. As such, the condenser 708 may remove some energy 782 from the reflux stream 756 and cooled, purified carbon dioxide recycle stream 758, typically by refrigeration. The cooled, purified carbon dioxide recycle stream 758 is substantially similar in composition to the purified carbon dioxide recycle stream 164 described above. Similarly, the reboiler 710 may receive a bottoms stream 760 from the separator 706 and produce a sour NGL rich stream 764 and a boil-up stream 762, which is returned to the separator 706. The reboiler 710 may be like any of the heat exchangers described herein, such as heat exchanger 702. In a specific embodiment, the reboiler 710 is a shell and tube heat exchanger coupled to a hot oil heater. As such, the reboiler 710 adds some energy 784 to the boil-up stream 762 and the sour NGL rich stream 764, typically by heating. The sour NGL rich stream 764 may be substantially similar in composition to the NGL rich stream 162, with the exception that the sour NGL rich stream 764 has some additional acid gases, e.g., acid gases 770 described below.

The sour NGL rich stream 764 then may be cooled in another heat exchanger 712. The heat exchanger 712 may be like any of the heat exchangers described herein, such as heat exchanger 702. For example, the heat exchanger 712 may be an air cooler as described above. A cooled, sour NGL rich stream 766 exits the heat exchanger 712 and enters a throttling valve 714. The throttling valve 714 may be an actual valve such as a gate valve, globe valve, angle valve, ball valve, butterfly valve, needle valve, or any other suitable valve, or may be a restriction in the piping such as an orifice or a pipe coil, bend, or size reduction. The throttling valve 714 may reduce the pressure, temperature, or both of the cooled, sour NGL rich stream 766 and produce a low-pressure sour NGL rich stream 768. The cooled, sour NGL rich stream 766 and the low-pressure sour NGL rich stream 768 have substantially the same composition as the sour NGL rich stream 764, albeit with lower energy levels.

The low-pressure sour NGL rich stream 768 then may be sweetened in a separator 716. The separator 716 may be similar to any of the separators described herein, such as separator 102. In an embodiment, the separator 716 may be one or more packed columns that use a sweetening process to remove acid gases 770 from the low-pressure sour NGL rich stream 768. Suitable sweetening processes include amine solutions, physical solvents such as SELEXOL or RECTISOL, mixed amine solution and physical solvents, potassium carbonate solutions, direct oxidation, absorption, adsorption using, e.g., molecular sieves, or membrane filtration. The separator 716 may produce the NGL rich stream 162 described above. In addition, any acid gases 770 accumulated within or exiting from the separator 716 may be stored, used for other processes, or suitably disposed of. Finally, while FIGS. 5 and 6 are described in the context of carbon dioxide recovery and/or reinjection, it will be appreciated that the concepts described herein can be applied to other recovery and/or reinjection processes, for example those using nitrogen, air, or water.

Figure 7:
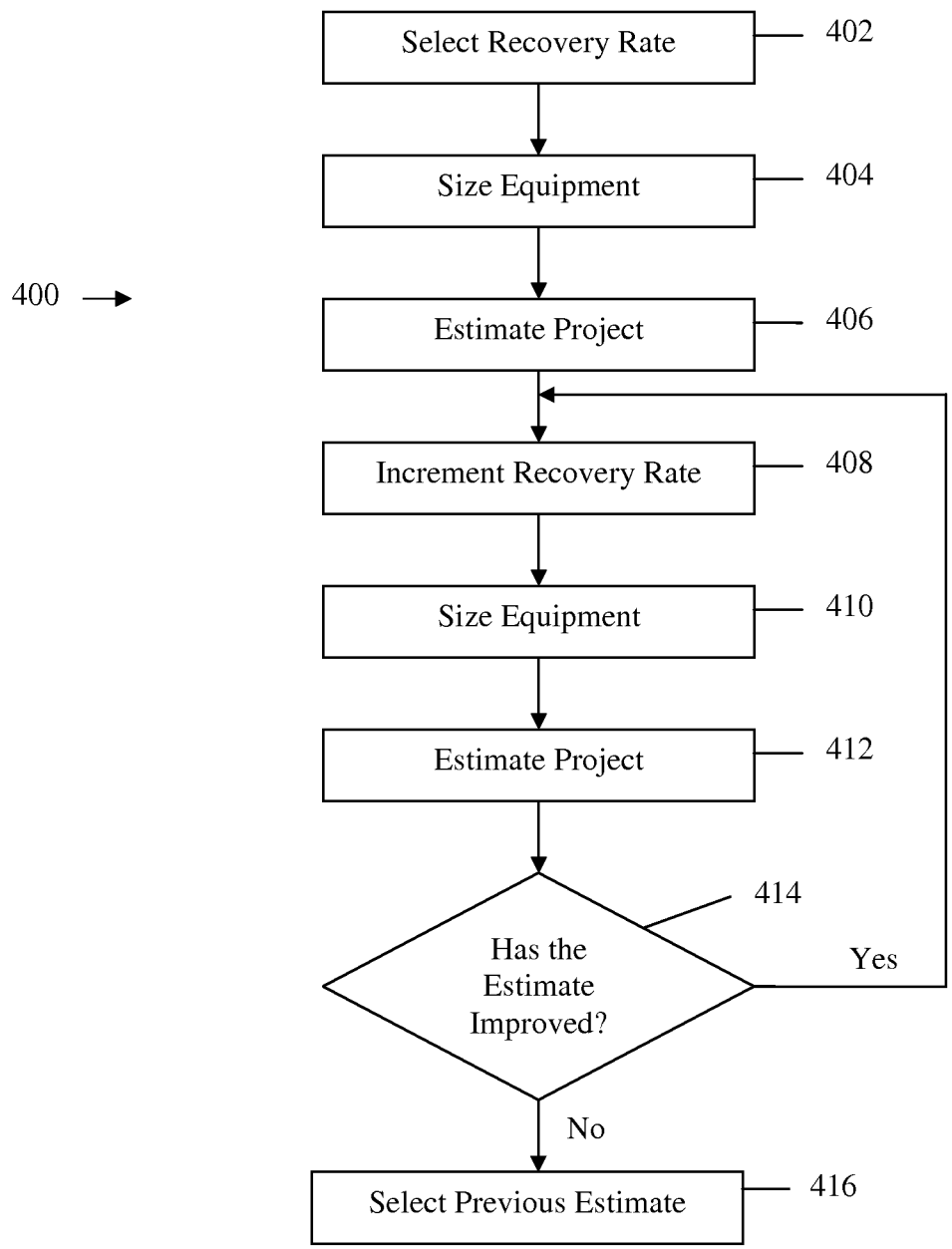
FIG. 7 is a flowchart of an embodiment of an NGL recovery optimization method.

As referenced above, FIG. 7 illustrates an embodiment of an NGL recovery optimization method 400. The NGL recovery optimization method 400 may be used to determine an improved or optimal project estimate for implementing the NGL recovery process and recovering NGLs at a suitable rate. As such, the NGL recovery process may be configured using appropriate equipment design based on the NGL recovery rate. Specifically, the NGL recovery optimization method 400 may design or configure the equipment size, quantity, or both based on an initial NGL recovery rate and required energy, and hence estimate the project feasibility and cost. The method 400 may upgrade or improve the project estimate by iteratively incrementing the initial NGL recovery rate, re-estimating the project, and comparing the two estimates.

At block 402, the method 400 may select an initial NGL recovery rate. The initial NGL recovery rate may be relatively small, such as no more than about 20 percent recovery, no more than about 10 percent recovery, no more than about 5 percent recovery, or no more than about 1 percent recovery. Choosing the initial NGL recovery rate at a small percentage of the total NGL amount may result in a relatively low project estimate that may be increased gradually to reach improved estimates.

The method 400 then may proceed to block 404, where the project equipment size may be determined based on the initial NGL recovery rate. Specifically, the size of the equipment described in the NGL recovery process and any additional compressors as described above may be determined. In addition, the pressure and temperature ratings and material compositions of such equipment may be determined at block 404, if desired.

The method 400 then may proceed to block 406, where the project may be estimated. Project estimation may comprise an economic evaluation of the NGL recovery process, and may include the cost of obtaining, fabricating, and/or field constructing the equipment sized in block 404. In addition, project estimation may include the cost of operating and maintaining the NGL process, as well as the revenue generated by the sale or use of the products obtained by implementing the NGL process. As such, the project estimate may comprise the total project benefits (including production, sales, etc.) minus the total project capital and operating costs (including cost, equipment, etc.). In some embodiments, the project estimate may be based on an existing carbon dioxide reinjection plant that lacks the NGL recovery process.

The method 400 then may proceed to block 408, where the recovery rate is incremented. The NGL recovery rate may be incremented by a relatively small percentage, for example no more than about 10 percent, not more than about 5 percent, or no more than about 1 percent. The method 400 then may proceed to block 410, which is substantially similar to block 404. The method 400 then may proceed to block 412, which is substantially similar to block 406.

The method 400 then may proceed to block 414, where the method 400 may determine whether the project estimate has improved. For instance, the method 400 may compare the project estimate from block 412 with the previous project estimate (either block 406 or the previous iteration of block 412) and determine whether the revised estimate is more economically desirable. The method 400 may return to block 408 when the condition at block 414 is met. Otherwise, the method 400 may proceed to block 416.

At block 416, the method 400 may choose the previous project estimate as the final estimate. For example, the method 400 may select the previous NGL recovery rate (either block 406 or the previous iteration of block 412) instead of the estimate obtained at block 412. In some embodiments, the desired or optimum recovery rate selected at block 416 may represent a range of desirable or optimum points, as opposed to a single point. Accordingly, the method 400 may select the equipment sizing corresponding to the selected NGL recovery rate. The selected project estimate and sizing then may be used for the NGL recovery process. Of course, it will be appreciated that the method 400 may be revised to include a decremented, top-down estimation approach as opposed to an incremented, bottom-up estimation approach.

The method 400 may have several advantages over other project estimation methods. For example, process equipment of a specific size may be selected, and the corresponding recovery rate determined. Alternatively, a required recovery rate may be selected, and the equipment sized to achieve the recovery rate. However, it has been discovered that such approaches are inflexible and often yields suboptimal process economics. For example, relatively high NGL recovery rates will not lead to an improvement in process economics, e.g., because of the exponential increase in energy consumption. In contrast, the method 400 provides a flexible approach to determining a desirable or optimal project estimate.

In an embodiment, the equipment size may be configured to allow for variations in recovery rates to accommodate changes in economic conditions, such as $C_{3+}$ or energy pricing. Specifically, the equipment described herein can be sized above or below the desired or optimum amount to allow the processes described herein to operate at recovery rates slightly greater than or slightly less than the desirable or optimum point obtained in method 400. As the process parameters and the energy requirements may be closely related, the ability of the process to continue to successfully operate under differing conditions may be reflected by constrained changes in the energy requirements of the process. When operating in the first amount 304 or the second amount 306 on the curve 302 in FIG. 3, significant increases or decreases in NGL recovery rate may be obtained with little change in the energy requirements. Such is not the case when operating in the third amount 308 on the curve 302 in FIG. 3, where significant increases or decreases in energy requirements yield only incremental changes in NGL recovery rate.

EXAMPLE 1

In one example, a process simulation was performed using the NGL recovery process 200 shown in FIG. 2. The simulation was performed using the Hyprotech Ltd. HYSYS Process v2.1.1 (Build 3198) software package. The NGL recovery process 200 separated the dehydrated carbon dioxide recycle stream 160 into the purified carbon dioxide recycle stream 164, the NGL rich stream 162, and the acid gas stream 270. The specified values are indicated by an asterisk (*). The physical properties are provided in degrees Fahrenheit (F), psig, million standard cubic feet per day (MMSCFD), pounds per hour (lb/hr), U.S. gallons per minute (USGPM), and British thermal units per hour (Btu/hr). The material streams, their compositions, and the associated energy streams produced by the simulation are provided in tables 1, 2, and 3 below, respectively.

TABLE 1

Material Streams

| Name | Dehydrated $CO_2$ Recycle Stream 160 | Cooled $CO_2$ Recycle Stream 252 | Cooled, Purified $CO_2$ Recycle Stream 258 |
|---|---|---|---|
| Vapor Fraction | 0.9838 | 0.9392 | 1.0000 |
| Temperature (F.) | 104.0* | 45.00* | 4.011 |
| Pressure (psig) | 340.0* | 335.0 | 330.0 |
| Molar Flow (MMSCFD) | 17.00* | 17.00 | 15.88 |
| Mass Flow (lb/hr) | 8.049e+04 | 8.049e+04 | 7.254e+04 |
| Liquid Volume Flow (USGPM) | 218.1 | 218.1 | 192.3 |
| Heat Flow (Btu/hr) | −2.639e+08 | −2.658e+08 | −2.577e+08 |

| Name | Purified $CO_2$ Recycle Stream 164 | Sour NGL Rich Stream 264 | Cooled Sour NGL Rich Stream 266 |
|---|---|---|---|
| Vapor Fraction | 1.0000 | 0.00000 | 0.0000 |
| Temperature (F.) | 97.39 | 202.6 | 120.0* |
| Pressure (psig) | 325.0 | 340.0 | 635.3* |
| Molar Flow (MMSCFD) | 15.88 | 1.119 | 1.119 |
| Mass Flow (lb/hr) | 7.254e+04 | 7947 | 7947 |
| Liquid Volume Flow (USGPM) | 192.3 | 25.84 | 25.84 |
| Heat Flow (Btu/hr) | −2.558e+08 | −8.443e+06 | −8.862e+06 |

| Name | Low-Pressure Sour NGL Rich Stream 268 | Acid Gas Stream 270 | NGL Rich Stream 162 |
|---|---|---|---|
| Vapor Fraction | 0.0000 | 1.0000 | 0.0000 |
| Temperature (F.) | 120.9 | 100.0* | 111.8 |
| Pressure (psig) | 200.3* | 5.304* | 185.3* |
| Molar Flow (MMSCFD) | 1.119 | 0.1030 | 1.016 |

TABLE 1-continued

Material Streams

| | | | |
|---|---|---|---|
| Mass Flow (lb/hr) | 7947 | 446.4 | 7501 |
| Liquid Volume Flow (USGPM) | 25.84 | 1.100 | 24.74 |
| Heat Flow (Btu/hr) | −8.862e+06 | −1.083e+06 | −7.779e+06 |

TABLE 2

Stream Compositions

| Name | Dehydrated $CO_2$ Recycle Stream 160 | Cooled $CO_2$ Recycle Stream 252 | Cooled, Purified $CO_2$ Recycle Stream 258 |
|---|---|---|---|
| Comp Mole Frac ($H_2S$) | 0.0333* | 0.0333 | 0.0327 |
| Comp Mole Frac (Nitrogen) | 0.0054* | 0.0054 | 0.0058 |
| Comp Mole Frac ($CO_2$) | 0.7842* | 0.7842 | 0.8359 |
| Comp Mole Frac (Methane) | 0.0521* | 0.0521 | 0.0558 |
| Comp Mole Frac (Ethane) | 0.0343* | 0.0343 | 0.0348 |
| Comp Mole Frac (Propane) | 0.0406* | 0.0406 | 0.0313 |
| Comp Mole Frac (i-Butane) | 0.0072* | 0.0072 | 0.0022 |
| Comp Mole Frac (n-Butane) | 0.0171* | 0.0171 | 0.0015 |
| Comp Mole Frac (i-Pentane) | 0.0058* | 0.0058 | 0.0000 |
| Comp Mole Frac (n-Pentane) | 0.0057* | 0.0057 | 0.0000 |
| Comp Mole Frac (n-Hexane) | 0.0070* | 0.0070 | 0.0000 |
| Comp Mole Frac (n-Octane) | 0.0071* | 0.0071 | 0.0000 |
| Comp Mole Frac ($H_2O$) | 0.0000* | 0.0000 | 0.0000 |

| Name | Purified $CO_2$ Recycle Stream 164 | Sour NGL Rich Stream 264 | Cooled Sour NGL Rich Stream 266 |
|---|---|---|---|
| Comp Mole Frac ($H_2S$) | 0.0327 | 0.0421 | 0.0421 |
| Comp Mole Frac (Nitrogen) | 0.0058 | 0.0000 | 0.0000 |
| Comp Mole Frac ($CO_2$) | 0.8359 | 0.0500 | 0.0500 |
| Comp Mole Frac (Methane) | 0.0558 | 0.0000 | 0.0000 |
| Comp Mole Frac (Ethane) | 0.0348 | 0.0281 | 0.0281 |
| Comp Mole Frac (Propane) | 0.0313 | 0.1728 | 0.1728 |
| Comp Mole Frac (i-Butane) | 0.0022 | 0.0789 | 0.0789 |
| Comp Mole Frac (n-Butane) | 0.0015 | 0.2388 | 0.2388 |
| Comp Mole Frac (i-Pentane) | 0.0000 | 0.0887 | 0.0887 |
| Comp Mole Frac (n-Pentane) | 0.0000 | 0.0866 | 0.0866 |
| Comp Mole Frac (n-Hexane) | 0.0000 | 0.1063 | 0.1063 |
| Comp Mole Frac (n-Octane) | 0.0000 | 0.1077 | 0.1077 |
| Comp Mole Frac ($H_2O$) | 0.0000 | 0.0000 | 0.0000 |

| Name | Low-Pressure Sour NGL Rich Stream 268 | Acid Gas Stream 270 | NGL Rich Stream 162 |
|---|---|---|---|
| Comp Mole Frac ($H_2S$) | 0.0421 | 0.4568 | 0.0000 |
| Comp Mole Frac (Nitrogen) | 0.0000 | 0.0000 | 0.0000 |
| Comp Mole Frac ($CO_2$) | 0.0500 | 0.5432 | 0.0000 |
| Comp Mole Frac (Methane) | 0.0000 | 0.0000 | 0.0000 |
| Comp Mole Frac (Ethane) | 0.0281 | 0.0000 | 0.0309 |
| Comp Mole Frac (Propane) | 0.1728 | 0.0000 | 0.1903 |
| Comp Mole Frac (i-Butane) | 0.0789 | 0.0000 | 0.0869 |
| Comp Mole Frac (n-Butane) | 0.2388 | 0.0000 | 0.2630 |
| Comp Mole Frac (i-Pentane) | 0.0887 | 0.0000 | 0.0977 |
| Comp Mole Frac (n-Pentane) | 0.0866 | 0.0000 | 0.0954 |
| Comp Mole Frac (n-Hexane) | 0.1063 | 0.0000 | 0.1171 |
| Comp Mole Frac (n-Octane) | 0.1077 | 0.0000 | 0.1186 |
| Comp Mole Frac ($H_2O$) | 0.0000 | 0.0000 | 0.0000 |

TABLE 3

Energy Streams

| Name | Heat Flow (Btu/hr) |
|---|---|
| Condenser Q Energy Stream 282 | 1.469e+06 |
| Reboiler Q Energy Stream 284 | 1.152e+06 |

EXAMPLE 2

In another example, the process simulation was repeated using a different dehydrated carbon dioxide recycle stream 160. The material streams, their compositions, and the associated energy streams produced by the simulation are provided in tables 4, 5, and 6 below, respectively.

TABLE 4

Material Streams

| Name | Dehydrated $CO_2$ Recycle Stream 160 | Cooled $CO_2$ Recycle Stream 252 | Cooled, Purified $CO_2$ Recycle Stream 258 |
|---|---|---|---|
| Vapor Fraction | 0.9874 | 0.9286 | 1.0000 |
| Temperature (F.) | 104.0* | 60.00* | 22.77 |
| Pressure (psig) | 685.3* | 680.3 | 590.0 |
| Molar Flow (MMSCFD) | 20.00* | 20.00 | 18.86 |
| Mass Flow (lb/hr) | 8.535e+04 | 8.535e+04 | 7.780e+04 |
| Liquid Volume Flow (USGPM) | 258.0 | 258.0 | 232.2 |
| Heat Flow (Btu/hr) | −2.741e+08 | −2.760e+08 | −2.683e+08 |

| Name | Purified $CO_2$ Recycle Stream 164 | Sour NGL Rich Stream 264 | Cooled Sour NGL Rich Stream 266 |
|---|---|---|---|
| Vapor Fraction | 1.0000 | 0.00000 | 0.0000 |
| Temperature (F.) | 87.48 | 290.7 | 120.0* |
| Pressure (psig) | 585.0 | 600.0 | 635.3* |
| Molar Flow (MMSCFD) | 18.86 | 1.139 | 1.139 |
| Mass Flow (lb/hr) | 7.780e+04 | 7552 | 7552 |
| Liquid Volume Flow (USGPM) | 232.2 | 25.83 | 25.83 |
| Heat Flow (Btu/hr) | −2.663e+08 | −7.411e+06 | −8.371e+06 |

| Name | Low-Pressure Sour NGL Rich Stream 268 | Acid Gas Stream 270 | NGL Rich Stream 162 |
|---|---|---|---|
| Vapor Fraction | 0.0000 | 1.0000 | 0.0000 |
| Temperature (F.) | 120.5 | 100.0* | 118.6 |
| Pressure (psig) | 200.3* | 5.304* | 185.3* |
| Molar Flow (MMSCFD) | 1.139 | 0.02943 | 1.110 |
| Mass Flow (lb/hr) | 7552 | 141.2 | 7411 |
| Liquid Volume Flow (USGPM) | 25.83 | 0.3421 | 25.49 |
| Heat Flow (Btu/hr) | −8.371e+06 | −5.301e+05 | −7.841e+06 |

TABLE 5

Stream Compositions

| Name | Dehydrated $CO_2$ Recycle Stream 160 | Cooled $CO_2$ Recycle Stream 252 | Cooled, Purified $CO_2$ Recycle Stream 258 |
|---|---|---|---|
| Comp Mole Frac ($H_2S$) | 0.0004* | 0.0004 | 0.0004 |
| Comp Mole Frac (Nitrogen) | 0.0153* | 0.0153 | 0.0162 |
| Comp Mole Frac ($CO_2$) | 0.6592* | 0.6592 | 0.6975 |
| Comp Mole Frac (Methane) | 0.1813* | 0.1813 | 0.1922 |

TABLE 5-continued

Stream Compositions

| | | | |
|---|---|---|---|
| Comp Mole Frac (Ethane) | 0.0620* | 0.0620 | 0.0620 |
| Comp Mole Frac (Propane) | 0.0411* | 0.0411 | 0.0275 |
| Comp Mole Frac (i-Butane) | 0.0064* | 0.0064 | 0.0017 |
| Comp Mole Frac (n-Butane) | 0.0179* | 0.0179 | 0.0024 |
| Comp Mole Frac (i-Pentane) | 0.0040* | 0.0040 | 0.0000 |
| Comp Mole Frac (n-Pentane) | 0.0049* | 0.0049 | 0.0000 |
| Comp Mole Frac (n-Hexane) | 0.0030* | 0.0030 | 0.0000 |
| Comp Mole Frac (n-Octane) | 0.0045* | 0.0045 | 0.0000 |
| Comp Mole Frac ($H_2O$) | 0.0000* | 0.0000 | 0.0000 |

| Name | Purified $CO_2$ Recycle Stream 164 | Sour NGL Rich Stream 264 | Cooled Sour NGL Rich Stream 266 |
|---|---|---|---|
| Comp Mole Frac ($H_2S$) | 0.0004 | 0.0008 | 0.0008 |
| Comp Mole Frac (Nitrogen) | 0.0162 | 0.0000 | 0.0000 |
| Comp Mole Frac ($CO_2$) | 0.6975 | 0.0250 | 0.0250 |
| Comp Mole Frac (Methane) | 0.1922 | 0.0000 | 0.0000 |
| Comp Mole Frac (Ethane) | 0.0620 | 0.0613 | 0.0613 |
| Comp Mole Frac (Propane) | 0.0275 | 0.2670 | 0.2670 |
| Comp Mole Frac (i-Butane) | 0.0017 | 0.0836 | 0.0836 |
| Comp Mole Frac (n-Butane) | 0.0024 | 0.2751 | 0.2751 |
| Comp Mole Frac (i-Pentane) | 0.0000 | 0.0697 | 0.0697 |
| Comp Mole Frac (n-Pentane) | 0.0000 | 0.0858 | 0.0858 |
| Comp Mole Frac (n-Hexane) | 0.0000 | 0.0527 | 0.0527 |
| Comp Mole Frac (n-Octane) | 0.0000 | 0.0790 | 0.0790 |
| Comp Mole Frac ($H_2O$) | 0.0000 | 0.0000 | 0.0000 |

| Name | Low-Pressure Sour NGL Rich Stream 268 | Acid Gas Stream 270 | NGL Rich Stream 162 |
|---|---|---|---|
| Comp Mole Frac ($H_2S$) | 0.0008 | 0.0315 | 0.0000 |
| Comp Mole Frac (Nitrogen) | 0.0000 | 0.0000 | 0.0000 |
| Comp Mole Frac ($CO_2$) | 0.0250 | 0.9685 | 0.0000 |
| Comp Mole Frac (Methane) | 0.0000 | 0.0000 | 0.0000 |
| Comp Mole Frac (Ethane) | 0.0613 | 0.0000 | 0.0629 |
| Comp Mole Frac (Propane) | 0.2670 | 0.0000 | 0.2740 |
| Comp Mole Frac (i-Butane) | 0.0836 | 0.0000 | 0.0858 |
| Comp Mole Frac (n-Butane) | 0.2751 | 0.0000 | 0.2824 |
| Comp Mole Frac (i-Pentane) | 0.0697 | 0.0000 | 0.0716 |
| Comp Mole Frac (n-Pentane) | 0.0858 | 0.0000 | 0.0881 |
| Comp Mole Frac (n-Hexane) | 0.0527 | 0.0000 | 0.0541 |
| Comp Mole Frac (n-Octane) | 0.0790 | 0.0000 | 0.0811 |
| Comp Mole Frac ($H_2O$) | 0.0000 | 0.0000 | 0.0000 |

TABLE 6

Energy Streams

| Name | Heat Flow (Btu/hr) |
|---|---|
| Condenser Q Energy Stream 282 | 1.884e+06 |
| Reboiler Q Energy Stream 284 | 2.211e+06 |

EXAMPLE 3

In a third example, the process simulation was repeated using a different dehydrated carbon dioxide recycle stream 160. The material streams, their compositions, and the associated energy streams produced by the simulation are provided in tables 7, 8, and 9 below, respectively.

TABLE 7

Material Streams

| Name | Dehydrated $CO_2$ Recycle Stream 160 | Cooled $CO_2$ Recycle Stream 252 | Cooled, Purified $CO_2$ Recycle Stream 258 |
|---|---|---|---|
| Vapor Fraction | 1.0000 | 0.9988 | 1.0000 |
| Temperature (F.) | 104.0* | 30.00* | 4.617 |
| Pressure (psig) | 340.0* | 335.0 | 330.0 |
| Molar Flow (MMSCFD) | 17.00* | 17.00 | 16.82 |
| Mass Flow (lb/hr) | 8.083e+04 | 8.083e+04 | 7.968e+04 |
| Liquid Volume Flow (USGPM) | 203.4 | 203.4 | 199.5 |
| Heat Flow (Btu/hr) | −3.016e+08 | −3.032e+08 | −3.025e+08 |

| Name | Purified $CO_2$ Recycle Stream 164 | Sour NGL Rich Stream 264 | Cooled Sour NGL Rich Stream 266 |
|---|---|---|---|
| Vapor Fraction | 1.0000 | 0.00000 | 0.0000 |
| Temperature (F.) | 76.45 | 199.4 | 120.0* |
| Pressure (psig) | 325.0 | 340.0 | 635.3* |
| Molar Flow (MMSCFD) | 16.82 | 0.1763 | 0.1763 |
| Mass Flow (lb/hr) | 7.968e+04 | 1153 | 1153 |
| Liquid Volume Flow (USGPM) | 199.5 | 3.894 | 3.894 |
| Heat Flow (Btu/hr) | −3.009e+08 | −1.278e+06 | −1.340e+06 |

| Name | Low-Pressure Sour NGL Rich Stream 268 | Acid Gas Stream 270 | NGL Rich Stream 162 |
|---|---|---|---|
| Vapor Fraction | 0.0000 | 1.0000 | 0.0000 |
| Temperature (F.) | 120.4 | 100.0* | 115.4 |
| Pressure (psig) | 200.3* | 5.304* | 185.3* |
| Molar Flow (MMSCFD) | 0.1763 | 0.01048 | 0.1659 |
| Mass Flow (lb/hr) | 1153 | 48.82 | 1105 |
| Liquid Volume Flow (USGPM) | 3.894 | 0.1188 | 3.776 |
| Heat Flow (Btu/hr) | −1.340e+06 | −1.653e+05 | −1.175e+06 |

TABLE 8

Stream Compositions

| Name | Dehydrated $CO_2$ Recycle Stream 160 | Cooled $CO_2$ Recycle Stream 252 | Cooled, Purified $CO_2$ Recycle Stream 258 |
|---|---|---|---|
| Comp Mole Frac ($H_2S$) | 0.0031* | 0.0031 | 0.0030 |
| Comp Mole Frac (Nitrogen) | 0.0008* | 0.0008 | 0.0008 |
| Comp Mole Frac ($CO_2$) | 0.9400* | 0.9400 | 0.9493 |
| Comp Mole Frac (Methane) | 0.0219* | 0.0219 | 0.0222 |
| Comp Mole Frac (Ethane) | 0.0156* | 0.0156 | 0.0157 |
| Comp Mole Frac (Propane) | 0.0116* | 0.0116 | 0.0088 |
| Comp Mole Frac (i-Butane) | 0.0015* | 0.0015 | 0.0002 |
| Comp Mole Frac (n-Butane) | 0.0031* | 0.0031 | 0.0001 |
| Comp Mole Frac (i-Pentane) | 0.0007* | 0.0007 | 0.0000 |
| Comp Mole Frac (n-Pentane) | 0.0006* | 0.0006 | 0.0000 |
| Comp Mole Frac (n-Hexane) | 0.0005* | 0.0005 | 0.0000 |
| Comp Mole Frac (n-Octane) | 0.0006* | 0.0006 | 0.0000 |
| Comp Mole Frac ($H_2O$) | 0.0000* | 0.0000 | 0.0000 |

| Name | Purified $CO_2$ Recycle Stream 164 | Sour NGL Rich Stream 264 | Cooled Sour NGL Rich Stream 266 |
|---|---|---|---|
| Comp Mole Frac ($H_2S$) | 0.0030 | 0.0094 | 0.0094 |
| Comp Mole Frac (Nitrogen) | 0.0008 | 0.0000 | 0.0000 |
| Comp Mole Frac ($CO_2$) | 0.9493 | 0.0500 | 0.0500 |
| Comp Mole Frac (Methane) | 0.0222 | 0.0000 | 0.0000 |
| Comp Mole Frac (Ethane) | 0.0157 | 0.0000 | 0.0000 |
| Comp Mole Frac (Propane) | 0.0088 | 0.2794 | 0.2794 |
| Comp Mole Frac (i-Butane) | 0.0002 | 0.1265 | 0.1265 |

TABLE 8-continued

Stream Compositions

| | | | |
|---|---|---|---|
| Comp Mole Frac (n-Butane) | 0.0001 | 0.2985 | 0.2985 |
| Comp Mole Frac (i-Pentane) | 0.0000 | 0.0713 | 0.0713 |
| Comp Mole Frac (n-Pentane) | 0.0000 | 0.0617 | 0.0617 |
| Comp Mole Frac (n-Hexane) | 0.0000 | 0.0482 | 0.0482 |
| Comp Mole Frac (n-Octane) | 0.0000 | 0.0550 | 0.0550 |
| Comp Mole Frac ($H_2O$) | 0.0000 | 0.0000 | 0.0000 |

| Name | Low-Pressure Sour NGL Rich Stream 268 | Acid Gas Stream 270 | NGL Rich Stream 162 |
|---|---|---|---|
| Comp Mole Frac ($H_2S$) | 0.0094 | 0.1584 | 0.0000 |
| Comp Mole Frac (Nitrogen) | 0.0000 | 0.0000 | 0.0000 |
| Comp Mole Frac ($CO_2$) | 0.0500 | 0.8416 | 0.0000 |
| Comp Mole Frac (Methane) | 0.0000 | 0.0000 | 0.0000 |
| Comp Mole Frac (Ethane) | 0.0000 | 0.0000 | 0.0000 |
| Comp Mole Frac (Propane) | 0.2794 | 0.0000 | 0.2970 |
| Comp Mole Frac (i-Butane) | 0.1265 | 0.0000 | 0.1345 |
| Comp Mole Frac (n-Butane) | 0.2985 | 0.0000 | 0.3174 |
| Comp Mole Frac (i-Pentane) | 0.0713 | 0.0000 | 0.0758 |
| Comp Mole Frac (n-Pentane) | 0.0617 | 0.0000 | 0.0656 |
| Comp Mole Frac (n-Hexane) | 0.0482 | 0.0000 | 0.0512 |
| Comp Mole Frac (n-Octane) | 0.0550 | 0.0000 | 0.0584 |
| Comp Mole Frac ($H_2O$) | 0.0000 | 0.0000 | 0.0000 |

TABLE 9

Energy Streams

| Name | Heat Flow (Btu/hr) |
|---|---|
| Condenser Q Energy Stream 282 | 6.236e+06 |
| Reboiler Q Energy Stream 284 | 5.666e+06 |

EXAMPLE 4

In a fourth example, a process simulation was performed using the NGL recovery/dehydration process 700 shown in FIG. 6. The simulation was performed using the Bryan Research and Engineering ProMax software package. The NGL recovery/dehydration process 700 separated the compressed carbon dioxide recycle stream 158 into the purified carbon dioxide recycle stream 164, the NGL rich stream 162, and the acid gas stream 770. The specified values are indicated by an asterisk (*). The material streams, their compositions, and the associated energy streams produced by the simulation are provided in tables 10, 11, and 12 below, respectively.

TABLE 10

Material Streams

| Name | Compressed Carbon Dioxide Recycle Stream 158 | Cooled Carbon Dioxide Recycle Stream 752 | Purified Carbon Dioxide Recycle Stream 164 |
|---|---|---|---|
| Temperature (° F.) | 110 | 55 | 72.0898 |
| Pressure (psig) | 535 | 532 | 526.909 |
| Mole Fraction Vapor (%) | 100 | 97.1149 | 100 |
| Mole Fraction Light Liquid (%) | 0 | 2.63789 | 0 |
| Mole Fraction Heavy Liquid (%) | 0 | 0.247192 | 0 |
| Molecular Weight (lb/lbmol) | 34.5734 | 34.5734 | 33.2372 |
| Molar Flow (lbmol/hr) | 143.165 | 143.165 | 136.153 |
| Vapor Volumetric Flow (ft$^3$/hr) | 1369.35 | 1144.29 | 1217.29 |
| Liquid Volumetric Flow (gpm) | 170.725 | 142.665 | 151.766 |
| Std Vapor Volumetric Flow (MMSCFD) | 1.30389 | 1.30389 | 1.24003 |
| Std Liquid Volumetric Flow (sgpm) | 16.1721 | 16.1721 | 14.7954 |
| Enthalpy (Btu/hr) | −1.54233E+07 | −1.55479E+07 | −1.49692E+07 |
| Net Ideal Gas Heating Value (Btu/ft$^3$) | 512.476 | 512.476 | 391.24 |

| Name | Cooled, Purified Carbon Dioxide Recycle Stream 758 | Dehydrated Vapor Recycle Stream 726 | NGL Rich Stream 162 |
|---|---|---|---|
| Temperature (° F.) | −4.70484 | 54.9077 | 121.117 |
| Pressure (psig) | 529.909 | 531 | 438.3 |
| Mole Fraction Vapor (%) | 100 | 99.9993 | 0 |
| Mole Fraction Light Liquid (%) | 0 | 0.000671338 | 100 |
| Mole Fraction Heavy Liquid (%) | 0 | 0 | 0 |
| Molecular Weight (lb/lbmol) | 33.2372 | 33.941 | 65.1996 |
| Molar Flow (lbmol/hr) | 136.153 | 138.957 | 5.97957 |
| Vapor Volumetric Flow (ft$^3$/hr) | 880.68 | 1140.73 | 10.8305 |
| Liquid Volumetric Flow (gpm) | 109.799 | 142.221 | 1.35029 |
| Std Vapor Volumetric Flow (MMSCFD) | 1.24003 | 1.26557 | 0.0544597 |

TABLE 10-continued

| Material Streams | | | |
|---|---:|---:|---:|
| Std Liquid Volumetric Flow (sgpm) | 14.7954 | 15.4591 | 1.2954 |
| Enthalpy (Btu/hr) | −1.50938E+07 | −1.51048E+07 | −405001 |
| Net Ideal Gas Heating Value (Btu/ft$^3$) | 391.24 | 463.982 | 3359.57 |

| Name | Aqueous Fluid Stream 732 | Sour NGL Rich Stream 764 | Cooled, Sour NGL Rich Stream 766 |
|---|---:|---:|---:|
| Temperature (° F.) | 54.9077 | 262.193 | 120 |
| Pressure (psig) | 531 | 531.909 | 521.909 |
| Mole Fraction Vapor (%) | 0 | 0 | 0 |
| Mole Fraction Light Liquid (%) | 100 | 100 | 100 |
| Mole Fraction Heavy Liquid (%) | 0 | 0 | 0 |
| Molecular Weight (lb/lbmol) | 18.2988 | 63.2785 | 63.2785 |
| Molar Flow (lbmol/hr) | 0.354052 | 6.58207 | 6.58207 |
| Vapor Volumetric Flow (ft$^3$/hr) | 0.103218 | 14.3659 | 11.2331 |
| Liquid Volumetric Flow (gpm) | 0.0128688 | 1.79107 | 1.40049 |
| Std Vapor Volumetric Flow (MMSCFD) | 0.00322458 | 0.0599471 | 0.0599471 |
| Std Liquid Volumetric Flow (sgpm) | 0.013039 | 1.36091 | 1.36091 |
| Enthalpy (Btu/hr) | −43829.7 | −468892 | −508612 |
| Net Ideal Gas Heating Value (Btu/ft$^3$) | 0.450311 | 3053.71 | 3053.71 |

| Name | Low-Pressure Sour NGL Rich Stream 768 | Acid Gases 770 |
|---|---:|---:|
| Temperature (° F.) | 120.145 | 120 |
| Pressure (psig) | 441.3 | 12.3041 |
| Mole Fraction Vapor (%) | 0 | 100 |
| Mole Fraction Light Liquid (%) | 100 | 0 |
| Mole Fraction Heavy Liquid (%) | 0 | 0 |
| Molecular Weight (lb/lbmol) | 63.2785 | 42.366 |
| Molar Flow (lbmol/hr) | 6.58207 | 0.645859 |
| Vapor Volumetric Flow (ft$^3$/hr) | 11.2586 | 147.542 |
| Liquid Volumetric Flow (gpm) | 1.40367 | 18.3949 |
| Std Vapor Volumetric Flow (MMSCFD) | 0.0599471 | 0.00588224 |
| Std Liquid Volumetric Flow (sgpm) | 1.36091 | 0.0667719 |
| Enthalpy (Btu/hr) | −508612 | −106053 |
| Net Ideal Gas Heating Value (Btu/ft$^3$) | 3053.71 | 9.39946 |

TABLE 11

| Stream Compositions | | | |
|---|---:|---:|---:|
| Name | Compressed Carbon Dioxide Recycle Stream 158 | Cooled Carbon Dioxide Recycle Stream 752 | Purified Carbon Dioxide Recycle Stream 164 |
| Comp Molar Flow H$_2$S (lb$_{mol}$/hr) | 0 | 0 | 0 |
| Comp Molar Flow Nitrogen (lb$_{mol}$/hr) | 5.42488 | 5.42488 | 5.42487 |
| Comp Molar Flow CO$_2$ (lb$_{mol}$/hr) | 78.374 | 78.374 | 77.7679 |
| Comp Molar Flow Methane (lb$_{mol}$/hr) | 46.8833 | 46.8833 | 46.8831 |
| Comp Molar Flow Ethane (lb$_{mol}$/hr) | 5.04264 | 5.04264 | 4.97376 |
| Comp Molar Flow Propane (lb$_{mol}$/hr) | 2.60218 | 2.60218 | 1.06689 |
| Comp Molar Flow i-Butane (lb$_{mol}$/hr) | 0.632167 | 0.632167 | 0.0262049 |
| Comp Molar Flow n-Butane (lb$_{mol}$/hr) | 1.01441 | 1.01441 | 0.0106494 |
| Comp Molar Flow i-Pentane (lb$_{mol}$/hr) | 0.543958 | 0.543958 | 2.47836E−05 |
| Comp Molar Flow n-Pentane (lb$_{mol}$/hr) | 0.27933 | 0.27933 | 6.5645E−06 |

TABLE 11-continued

Stream Compositions

| | | | |
|---|---|---|---|
| Comp Molar Flow n-Hexane (lb$_{mol}$/hr) | 1.94061 | 1.94061 | 6.8325E−08 |
| Comp Molar Flow n-Heptane (lb$_{mol}$/hr) | 0 | 0 | 0 |
| Comp Molar Flow H$_2$O (lb$_{mol}$/hr) | 0.427428 | 0.427428 | 1.88221E−05 |
| Comp Molar Flow Diethyle Amine (lb$_{mol}$/hr) | 0 | 0 | 0 |

| Name | Cooled, Purified Carbon Dioxide Recycle Stream 758 | Dehydrated Vapor Recycle Stream 726 | NGL Rich Stream 162 |
|---|---|---|---|
| Comp Molar Flow H$_2$S (lb$_{mol}$/hr) | 0 | 0 | 0 |
| Comp Molar Flow Nitrogen (lb$_{mol}$/hr) | 5.42487 | 5.41324 | 5.81573E−09 |
| Comp Molar Flow CO$_2$ (lb$_{mol}$/hr) | 77.7679 | 77.1797 | 1.75658E−06 |
| Comp Molar Flow Methane (lb$_{mol}$/hr) | 46.8831 | 46.6143 | 2.21379E−05 |
| Comp Molar Flow Ethane (lb$_{mol}$/hr) | 4.97376 | 4.89657 | 0.068452 |
| Comp Molar Flow Propane (lb$_{mol}$/hr) | 1.06689 | 2.39516 | 1.53245 |
| Comp Molar Flow i-Butane (lb$_{mol}$/hr) | 0.0262049 | 0.529946 | 0.605608 |
| Comp Molar Flow n-Butane (lb$_{mol}$/hr) | 0.0106494 | 0.799268 | 1.00312 |
| Comp Molar Flow i-Pentane (lb$_{mol}$/hr) | 2.47836E−05 | 0.345064 | 0.543843 |
| Comp Molar Flow n-Pentane (lb$_{mol}$/hr) | 6.5645E−06 | 0.161123 | 0.279274 |
| Comp Molar Flow n-Hexane (lb$_{mol}$/hr) | 6.8325E−08 | 0.622204 | 1.9405 |
| Comp Molar Flow n-Heptane (lb$_{mol}$/hr) | 0 | 0 | 0 |
| Comp Molar Flow H$_2$O (lb$_{mol}$/hr) | 1.88221E−05 | 0.000761257 | 0.0062375 |
| Comp Molar Flow Diethyle Amine (lb$_{mol}$/hr) | 0 | 0 | 7.30571E−05 |

| Name | Aqueous Fluid Stream 732 | Sour NGL Rich Stream 764 | Cooled, Sour NGL Rich Stream 766 |
|---|---|---|---|
| Comp Molar Flow H$_2$S (lb$_{mol}$/hr) | 0 | 0 | 0 |
| Comp Molar Flow Nitrogen (lb$_{mol}$/hr) | 7.93825E−06 | 5.94147E−09 | 5.94147E−09 |
| Comp Molar Flow CO$_2$ (lb$_{mol}$/hr) | 0.00385078 | 0.602328 | 0.602328 |
| Comp Molar Flow Methane (lb$_{mol}$/hr) | 0.000125243 | 2.25954E−05 | 2.25954E−05 |
| Comp Molar Flow Ethane (lb$_{mol}$/hr) | 1.31496E−05 | 0.0688655 | 0.0688655 |
| Comp Molar Flow Propane (lb$_{mol}$/hr) | 6.92895E−06 | 1.53528 | 1.53528 |
| Comp Molar Flow i-Butane (lb$_{mol}$/hr) | 4.43906E−07 | 0.605962 | 0.605962 |
| Comp Molar Flow n-Butane (lb$_{mol}$/hr) | 1.35201E−06 | 1.00376 | 1.00376 |
| Comp Molar Flow i-Pentane (lb$_{mol}$/hr) | 3.68843E−07 | 0.543932 | 0.543932 |
| Comp Molar Flow n-Pentane (lb$_{mol}$/hr) | 1.57397E−07 | 0.279323 | 0.279323 |
| Comp Molar Flow n-Hexane (lb$_{mol}$/hr) | 1.94686E−07 | 1.9406 | 1.9406 |
| Comp Molar Flow n-Heptane (lb$_{mol}$/hr) | 0 | 0 | 0 |
| Comp Molar Flow H$_2$O (lb$_{mol}$/hr) | 0.350046 | 0.00199881 | 0.00199881 |
| Comp Molar Flow Diethyle Amine (lb$_{mol}$/hr) | 0 | 0 | 0 |

| Name | Low-Pressure Sour NGL Rich Stream 768 | Acid Gases 770 |
|---|---|---|
| Comp Molar Flow H$_2$S (lb$_{mol}$/hr) | 0 | 0 |
| Comp Molar Flow Nitrogen (lb$_{mol}$/hr) | 5.94147E−09 | 0 |
| Comp Molar Flow CO$_2$ (lb$_{mol}$/hr) | 0.602328 | 0.602272 |
| Comp Molar Flow Methane (lb$_{mol}$/hr) | 2.25954E−05 | 2.56258E−07 |

TABLE 11-continued

Stream Compositions

| | | |
|---|---|---|
| Comp Molar Flow Ethane ($lb_{mol}$/hr) | 0.0688655 | 0.000254578 |
| Comp Molar Flow Propane ($lb_{mol}$/hr) | 1.53528 | 0.00159919 |
| Comp Molar Flow i-Butane ($lb_{mol}$/hr) | 0.605962 | 0.00016306 |
| Comp Molar Flow n-Butane ($lb_{mol}$/hr) | 1.00376 | 0.000353691 |
| Comp Molar Flow i-Pentane ($lb_{mol}$/hr) | 0.543932 | 3.41627E−05 |
| Comp Molar Flow n-Pentane ($lb_{mol}$/hr) | 0.279323 | 2.16905E−05 |
| Comp Molar Flow n-Hexane ($lb_{mol}$/hr) | 1.9406 | 4.4341E−05 |
| Comp Molar Flow n-Heptane ($lb_{mol}$/hr) | 0 | 0 |
| Comp Molar Flow $H_2O$ ($lb_{mol}$/hr) | 0.00199881 | 0.0411157 |
| Comp Molar Flow Diethyle Amine ($lb_{mol}$/hr) | 0 | 4.17895E−20 |

TABLE 12

Energy Streams

| Name | Heat Flow (Btu/hr) |
|---|---|
| Condenser Energy Stream 782 | 320524 |
| Reboiler Energy Stream 784 | 253961 |

EXAMPLE 5

In a fifth example, the process simulation was continued for the NGL upgrade process 500 shown in FIG. 4. The simulation was performed using the Aspen Tech. HYSYS Version 7.2 (previously Hyprotech Ltd. HYSYS) software package. The NGL upgrade process 500 separates the NGL rich stream 162 into the heavy NGL stream 172 and the light NGL stream 174. In the following tables and results, the low-pressure sour NGL rich stream 268 has the composition as determined by the simulation model of the low-pressure sour NGL rich stream 768 from Example 4. Similarly, the acid gas stream 270 has the composition as determined by the simulation model of the acid gas stream 770 from Example 4. In addition, the NGL rich stream 162 has the composition as determined by the simulation model of the NGL rich stream 162 from Example 4. The material streams, their compositions, and the associated energy streams produced by the simulation are provided in tables 13, 14, and 15 below, respectively.

TABLE 13

Material Streams

| Name | Low-Pressure Sour NGL Rich Stream 268 | Acid Gas Stream 270 | NGL Rich Stream 162 |
|---|---|---|---|
| Vapor Fraction | 0.0000 | 1.0000 | 0.0000 |
| Temperature (F.) | 120.145 | 120.0 | 94.16 |
| Pressure (psig) | 441.3 | 12.3041 | 250.0 |
| Molar Flow (MMSCFD) | 0.321888 | 5.8822e−002 | 1.019 |
| Mass Flow (lb/hr) | 416.5033 | 27.362473 | 7567 |
| Standard Liquid Volume Flow (barrel/day) | 46.6598 | 2.2893 | 840.0 |
| Heat Flow (Btu/hr) | −508612 | −106053 | −7.920e+006 |

TABLE 13-continued

Material Streams

| Name | Overhead Stream 524 | Heavy NGL Stream 514 | Light NGL Stream 174 |
|---|---|---|---|
| Vapor Fraction | 1.0000 | 0.0000 | 0.0000 |
| Temperature (F.) | 185.7 | 270.6 | 134.0 |
| Pressure (psig) | 160.0 | 165.0 | 155.0 |
| Molar Flow (MMSCFD) | 0.3687 | 0.6507 | 0.3687 |
| Mass Flow (lb/hr) | 2186 | 5381 | 2186 |
| Standard Liquid Volume Flow (barrel/day) | 266.4 | 576.5 | 266.4 |
| Heat Flow (Btu/hr) | −2.029e+006 | −4.885e+006 | −2.367e+006 |

| Name | Cooled, Heavy NGL Stream 172 |
|---|---|
| Vapor Fraction | 0.0000 |
| Temperature (F.) | 100.0 |
| Pressure (psig) | 160.0 |
| Molar Flow (MMSCFD) | 0.6507 |
| Mass Flow (lb/hr) | 5381 |
| Standard Liquid Volume Flow (barrel/day) | 576.5 |
| Heat Flow (Btu/hr) | −5.478e+006 |

TABLE 14

Stream Compositions

| Name | Low-Pressure Sour NGL Rich Stream 268 | Acid Gas Stream 270 | NGL Rich Stream 162 |
|---|---|---|---|
| Comp Mole Frac ($H_2S$) | | | 0.0000 |
| Comp Mole Frac (Nitrogen) | | | 0.0000 |
| Comp Mole Frac ($CO_2$) | 0.09151 | 0.93251 | 0.0000 |
| Comp Mole Frac (Methane) | 0.00000 | 0.00000 | 0.0000 |
| Comp Mole Frac (Ethane) | 0.01046 | 0.00039 | 0.0027 |
| Comp Mole Frac (Propane) | 0.23325 | 0.00248 | 0.1653 |
| Comp Mole Frac (i-Butane) | 0.09206 | 0.00025 | 0.0756 |
| Comp Mole Frac (n-Butane) | 0.15250 | 0.00055 | 0.2423 |
| Comp Mole Frac (i-Pentane) | 0.08264 | 0.00005 | 0.1092 |
| Comp Mole Frac (n-Pentane) | 0.04244 | 0.00003 | 0.0915 |
| Comp Mole Frac (n-Hexane) | 0.29483 | 0.00007 | 0.2943 |
| Comp Mole Frac (n-Heptane) | 0.00000 | 0.00000 | 0.0191 |
| Comp Mole Frac (n-Octane) | — | — | 0.0000 |
| Comp Mole Frac ($H_2O$) | 0.00030 | 0.06366 | 0.0000 |

TABLE 14-continued

Stream Compositions

| Name | Overhead Stream 524 | Heavy NGL Stream 514 | Light NGL Stream 174 |
|---|---|---|---|
| Comp Mole Frac ($H_2S$) | 0.0000 | 0.0000 | 0.0000 |
| Comp Mole Frac (Nitrogen) | 0.0000 | 0.0000 | 0.0000 |
| Comp Mole Frac ($CO_2$) | 0.0000 | 0.0000 | 0.0000 |
| Comp Mole Frac (Methane) | 0.0000 | 0.0000 | 0.0000 |
| Comp Mole Frac (Ethane) | 0.0075 | 0.0000 | 0.0075 |
| Comp Mole Frac (Propane) | 0.4547 | 0.0013 | 0.4547 |
| Comp Mole Frac (i-Butane) | 0.1330 | 0.0431 | 0.1330 |
| Comp Mole Frac (n-Butane) | 0.2751 | 0.2236 | 0.2751 |
| Comp Mole Frac (i-Pentane) | 0.0486 | 0.1435 | 0.0486 |
| Comp Mole Frac (n-Pentane) | 0.0359 | 0.1230 | 0.0359 |
| Comp Mole Frac (n-Hexane) | 0.0437 | 0.4363 | 0.0437 |
| Comp Mole Frac (n-Heptane) | 0.0013 | 0.0292 | 0.0013 |
| Comp Mole Frac (n-Octane) | 0.0000 | 0.0000 | 0.0000 |
| Comp Mole Frac ($H_2O$) | 0.0000 | 0.0000 | 0.0000 |

| Name | Cooled, Heavy NGL Stream 172 |
|---|---|
| Comp Mole Frac ($H_2S$) | 0.0000 |
| Comp Mole Frac (Nitrogen) | 0.0000 |
| Comp Mole Frac ($CO_2$) | 0.0000 |
| Comp Mole Frac (Methane) | 0.0000 |
| Comp Mole Frac (Ethane) | 0.0000 |
| Comp Mole Frac (Propane) | 0.0013 |
| Comp Mole Frac (i-Butane) | 0.0431 |
| Comp Mole Frac (n-Butane) | 0.2236 |
| Comp Mole Frac (i-Pentane) | 0.1435 |
| Comp Mole Frac (n-Pentane) | 0.1230 |
| Comp Mole Frac (n-Hexane) | 0.4363 |
| Comp Mole Frac (n-Heptane) | 0.0292 |
| Comp Mole Frac (n-Octane) | 0.0000 |
| Comp Mole Frac ($H_2O$) | 0.0000 |

TABLE 15

Energy Streams

| Name | Heat Flow (Btu/hr) |
|---|---|
| Reboiler Energy Stream 516 | $25.4 \times 10^3$ |
| Cooling Fluid Stream 522 | $39.72 \times 10^3$ |

It should be highlighted that in at least certain embodiments that streams in an NGL recovery system (e.g., a hydrocarbon feed stream, a carbon dioxide recycle stream, and/or an NGL rich stream) are not subjected to cryogenic conditions, membranes, and/or carbon dioxide recovery solvents between being received and being separated into output streams (e.g., a heavy hydrocarbon rich stream, a purified carbon dioxide recycle stream, an NGL rich stream, and/or an acid gas stream). For instance, other recovery systems may use a carbon dioxide recovery solvent to separate carbon dioxide from a stream (e.g., use a carbon dioxide recovery solvent to absorb/dissolve carbon dioxide from a stream comprising both hydrocarbons and carbon dioxide).

Furthermore, it should also be highlighted that some embodiments may use a dehydration solvent to remove water (e.g., liquid water or water vapor) despite optionally not using a carbon dioxide recovery solvent. For example, in certain circumstances, an incoming feed stream may be "wet" in that it contains some amount of water vapor. In such cases, a dehydration solvent such as, but not limited to, triethylene glycol (TEG), diethylene glycol (DEG), ethylene glycol (MEG), tetraethylene glycol (TREG), other glycols, or any other dehydration solvent may be used to remove the water from the stream. However, embodiments are not limited to any particular method of dehydrating a stream and other methods of dehydrating a stream can be used as well.

As used herein, the term consisting essentially of excludes additional equilibrium-staged separation or reaction processes, but does not exclude additional piping, accumulators, heat exchangers, pipe tees and similar "simple" separations, valves, sensors, material transfer devices, or anything else that does not materially change the inherent properties of a significant portion of the streams in question.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, e.g., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A method comprising:
separating a feed stream into a carbon dioxide recycle stream and a heavy hydrocarbon stream, wherein the carbon dioxide recycle stream comprises carbon dioxide and natural gas liquids, and wherein the heavy hydrocarbon stream comprises substantially all $C_{9+}$ hydrocarbons from the feed stream;
separating the carbon dioxide recycle stream into a purified carbon dioxide recycle stream and a natural gas liquids stream, wherein the purified carbon dioxide recycle stream comprises the carbon dioxide, wherein the natural gas liquids stream comprises the natural gas liquids, and wherein the natural gas liquids stream is substantially free of $C_{9+}$ hydrocarbons;
separating the natural gas liquids stream into an acid gas stream and a sweetened natural gas liquids stream;
separating the sweetened natural gas liquids stream into a light natural gas liquids stream and a heavy natural gas liquids stream after the acid gas stream has been separated from the natural gas liquids stream; and
combining the heavy natural gas liquids stream with the heavy hydrocarbon stream that comprises substantially all $C_{9+}$, hydrocarbons from the feed stream to generate an upgraded natural gas liquids stream.

2. The method according to claim 1, wherein the feed stream comprises $C_1$ to $C_2$ hydrocarbons, and wherein separating the carbon dioxide recycle stream into the purified carbon dioxide recycle stream and the natural gas liquids stream comprises separating the $C_1$ to $C_2$ hydrocarbons into the purified carbon dioxide recycle stream.

3. The method according to claim 1, wherein separating the carbon dioxide recycle stream into the purified carbon dioxide recycle stream and the natural gas liquids stream consists essentially of:
receiving the carbon dioxide recycle stream at a separation column;
reboiling a portion of the carbon dioxide recycle stream received from the separation column with a reboiler to generate the natural gas liquids stream; and
condensing another portion of the carbon dioxide recycle stream received from the separation column with a condenser to generate the purified carbon dioxide recycle stream.

4. A set of process equipment comprising:
a first separator configured to separate a feed stream into a recycle stream and a heavy hydrocarbons stream, wherein the recycle stream comprises an injection gas and natural gas liquids, and wherein the heavy hydrocarbons stream comprises substantially all $C_{9+}$ hydrocarbons from the feed stream;
a second separator configured to separate the recycle stream into a purified recycle stream and a natural gas liquids stream, wherein the purified recycle stream comprises the injection gas, wherein the natural gas liquids stream comprises the natural gas liquids, and wherein the natural gas liquids stream is substantially free of $C_{9+}$ hydrocarbons;

a third separator configured to separate the natural gas liquids stream into an acid gas stream and a sweetened natural gas liquids stream;
a fourth separator configured to separate the sweetened natural gas liquids stream into a light natural gas liquids stream and a heavy natural gas liquids stream after the acid gas stream has been separated from the natural gas liquids stream in the third separator; and
a mixer configured to combine the heavy natural liquids stream with the heavy hydrocarbon stream that comprises substantially all $C_{9+}$ hydrocarbons from the feed stream to generate an upgraded natural gas liquids stream.

5. The set of process equipment according to claim 4, further comprising a first compressor, a second compressor, and a gas supply, wherein the first compressor is configured to increase a pressure of the recycle stream, wherein the second compressor is configured to increase a pressure of the purified recycle stream, and wherein the gas supply is configured to provide additional injection gas to the purified recycle stream.

6. The set of process equipment according to claim 4, further comprising:
a heat exchanger configured to cool the recycle stream using the purified recycle stream; and
a dehydrator between the first separator and the second separator that is configured to dehydrate the recycle stream.

7. The set of process equipment according to claim 4, wherein the second separator consists essentially of a separation column, a reboiler, and a condenser, wherein the separation column receives the recycle stream, wherein the reboiler receives a first portion of the recycle stream from the separation column and generates the natural gas liquids stream, and wherein the condenser receives a second portion of the recycle stream from the separation column and generates the purified recycle stream.

8. A system comprising:
piping configured to receive a feed stream, wherein the feed stream comprises an injection gas, $C_3$ to $C_8$ hydrocarbons, and $C_{9+}$ hydrocarbons;
a first separator coupled to the piping and configured to separate the feed stream into a recycle stream and a heavy hydrocarbons stream, wherein the recycle stream comprises the injection gas and the $C_3$ to $C_8$ hydrocarbons, and wherein the heavy hydrocarbons stream comprises substantially all of the $C_{9+}$ hydrocarbons from the feed stream;
a second separator configured to receive the recycle stream from the first separator and separate the recycle stream into a purified recycle stream and a natural gas liquids stream, wherein the purified recycle stream comprises the injection gas, wherein the natural gas liquids stream comprises the $C_3$ to $C_8$ hydrocarbons, and wherein the natural gas liquids stream is substantially free of $C_{9+}$ hydrocarbons;
a third separator configured to separate the natural gas liquids stream into an acid gas stream and a sweetened natural gas liquids stream;
a fourth separator configured to separate the sweetened natural gas liquids stream into a light natural gas liquids stream and a heavy natural gas liquids stream after the acid gas stream has been separated from the natural gas liquids stream in the third separator: and
a mixer configured to combine the heavy natural gas liquids stream with the heavy hydrocarbon stream that comprises substantially all $C_{9+}$ hydrocarbons from the feed stream to generate an upgraded natural gas liquids stream.

9. The system according to claim 8, wherein the first separator comprises a knock-out drum, and wherein the feed stream, the recycle stream, and the purified recycle stream comprise methane or ethane.

10. The system according to claim 8, wherein the second separator consists essentially of a separation column, a reboiler, and a condenser, wherein the separation column receives the recycle stream, wherein the reboiler receives a first portion of the recycle stream from the separation column and generates the natural gas liquids stream, and wherein the condenser receives a second portion of the recycle stream from the separation column and generates the purified recycle stream.

* * * * *